(12) United States Patent
Cai et al.

(10) Patent No.: US 11,909,898 B2
(45) Date of Patent: Feb. 20, 2024

(54) MOBILE TERMINAL, COVER, DISPLAY COMPONENT

(71) Applicant: HUAWEI TECHNOLOGIES CO., LTD., Guangdong (CN)

(72) Inventors: Qi Cai, Shanghai (CN); Jiao Lin, Shanghai (CN); Xu Peng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 313 days.

(21) Appl. No.: 17/604,304

(22) PCT Filed: Feb. 25, 2020

(86) PCT No.: PCT/CN2020/076591
§ 371 (c)(1),
(2) Date: Oct. 15, 2021

(87) PCT Pub. No.: WO2020/211534
PCT Pub. Date: Oct. 22, 2020

(65) Prior Publication Data
US 2022/0201106 A1    Jun. 23, 2022

(30) Foreign Application Priority Data
Apr. 17, 2019  (CN) .......................... 201910310113.4

(51) Int. Cl.
*H04M 1/02* (2006.01)
*C08J 5/18* (2006.01)
(Continued)

(52) U.S. Cl.
CPC ............ *H04M 1/0266* (2013.01); *C08J 5/18* (2013.01); *C08J 7/042* (2013.01); *H10K 50/86* (2023.02);
(Continued)

(58) Field of Classification Search
CPC .......... C08J 5/18; C08J 7/042; C08J 2367/02; H10K 50/86; H10K 59/65;
(Continued)

(56) References Cited

U.S. PATENT DOCUMENTS

2008/0258614 A1* 10/2008 Ha .................... H10K 50/86
359/485.05
2017/0061193 A1   3/2017 Young et al.
(Continued)

FOREIGN PATENT DOCUMENTS

CN         204480194 U      7/2015
CN         104866814 A      8/2015
(Continued)

*Primary Examiner* — Andrew Wendell
(74) *Attorney, Agent, or Firm* — WOMBLE BOND DICKINSON (US) LLP

(57) ABSTRACT

This application provides a mobile terminal and relates to the field of display technologies. The mobile terminal includes a display panel, a cover body, a photoelectric conversion apparatus, and a bearer layer. The bearer layer includes a non-polarized part, where the bearer layer is disposed between the cover body and the display panel, and the bearer layer is located in a partial transmissive region of the display region, where an orthographic projection of the photoelectric conversion apparatus on the bearer layer is located in an orthographic projection of the non-polarized part on the bearer layer, and the non-polarized part is configured to enable a polarization direction of light. Furthermore, the mobile terminal includes an ink layer, disposed on a surface of the bearer layer, where the ink layer is located in a peripheral region of the mobile terminal. As discussed herein, the techniques resolve a problem of how to evenly print ink in a corresponding peripheral region of the mobile terminal.

17 Claims, 21 Drawing Sheets

(51) Int. Cl.
  *C08J 7/04* (2020.01)
  *H10K 50/86* (2023.01)
  *H10K 59/65* (2023.01)
  *G02F 1/1333* (2006.01)

(52) U.S. Cl.
  CPC .......... *H10K 59/65* (2023.02); *C08J 2367/02* (2013.01); *G02F 1/133331* (2021.01)

(58) Field of Classification Search
  CPC .............. G02F 1/133331; G06F 21/32; G06V 40/1318; H04M 1/0266; H04M 1/026; H04M 1/0295; H04M 1/02; H04B 1/03; H04B 1/08
  See application file for complete search history.

(56) References Cited

U.S. PATENT DOCUMENTS

| | | | |
|---|---|---|---|
| 2018/0107312 A1 | 4/2018 | Wang et al. | |
| 2018/0145283 A1* | 5/2018 | Hack | H10K 59/00 |
| 2018/0188590 A1* | 7/2018 | Gu | G02F 1/133504 |
| 2018/0201027 A1* | 7/2018 | Suzuki | B41J 2/442 |
| 2019/0077121 A1* | 3/2019 | Lee | G06F 1/12 |
| 2019/0162881 A1* | 5/2019 | Cammenga | G02B 5/3058 |
| 2019/0363290 A1* | 11/2019 | Watanabe | H05B 33/10 |

FOREIGN PATENT DOCUMENTS

| | | |
|---|---|---|
| CN | 106909243 A | 6/2017 |
| CN | 206331451 U | 7/2017 |
| CN | 107025031 A | 8/2017 |
| CN | 107770305 A | 3/2018 |
| CN | 108790342 A | 11/2018 |
| CN | 208110456 U | 11/2018 |
| CN | 109167859 A | 1/2019 |
| CN | 109327582 A | 2/2019 |
| CN | 109348001 A | 2/2019 |
| CN | 208607633 U | 3/2019 |
| CN | 208673297 U | 3/2019 |
| CN | 109946780 A | 6/2019 |
| CN | 110149425 A | 8/2019 |
| EP | 3361415 A1 | 8/2018 |
| EP | 3383006 A1 | 10/2018 |
| JP | 2018082438 A | 5/2018 |
| WO | 2019066414 A1 | 4/2019 |

* cited by examiner

MOBILE TERMINAL, COVER, DISPLAY COMPONENT

CROSS-REFERENCE TO RELATED APPLICATIONS

This application is a national stage of International Application No. PCT/CN2020/076591, filed on Feb. 25, 2020, which claims priority to Chinese Patent Application No. 201910310113.4, filed on Apr. 17, 2019. Both of the aforementioned applications are hereby incorporated by reference in their entireties.

TECHNICAL FIELD

This application relates to the field of display technologies, and in particular, to a mobile terminal, a cover, and a display component.

BACKGROUND

Due to a restriction of an existing design and process, a peripheral region needs to be reserved around an existing mobile terminal to place components such as a drive circuit and a frame sealant. To shield the component in the peripheral region and ensure an appearance effect and display quality of the mobile terminal, an ink layer is usually disposed in a corresponding peripheral region of a cover body of the mobile terminal.

With current technology, ink is directly printed on the cover body to form the ink layer in the corresponding peripheral region of the cover body. However, in this manner, there are problems such as an ink residue, an uneven thickness of printed ink, and a display color difference, which affect display and appearance effects.

SUMMARY

Embodiments of this application provide a mobile terminal, a cover, and a display component, to resolve a problem of how to evenly print ink a corresponding peripheral region of the mobile terminal.

To achieve the foregoing objective, the embodiments use the following technical solutions:

According to a first aspect, a mobile terminal is provided, including: a display panel; a cover body, located on a light emitting side of the display panel; a photoelectric conversion apparatus, located in a display region of the mobile terminal; a bearer layer, including a non-polarized part, where the bearer layer is disposed between the cover body and the display panel, and the bearer layer is located in a partial transmissive region of the display region, where an orthographic projection of the photoelectric conversion apparatus on the bearer layer is located in an orthographic projection of the non-polarized part on the bearer layer, and the non-polarized part is configured to enable a polarization direction of light before the light passes through the non-polarized part to be the same as a polarization direction of the light after the light passes through the non-polarized part; and an ink layer, disposed on a surface of the bearer layer, where the ink layer is located in a peripheral region of the mobile terminal. In this application, the bearer layer includes the non-polarized part, and the non-polarized part has a function of not changing a polarization direction of alight. Therefore, when only a transmissive feature of light is considered without considering another light loss, there is no light intensity loss when light passes through the non-polarized part once, thereby improving a signal that finally reaches the photoelectric conversion apparatus.

Optionally, the non-polarized part is located in the display region. In this way, a material of another part of the bearer layer is not limited, so that costs of the bearer layer can be reduced.

Optionally, the non-polarized part is in a hollowed-out structure, so as to simplify a process and reduce costs.

Optionally, the non-polarized part is located in the display region and the peripheral region. The non-polarized part is enabled to cover the display region, so as to reduce a filtering function of the bearer layer on displayed light, thereby improving a display effect and reducing power consumption.

Based on this, optionally, a material constituting the non-polarized part is a non-polarized material.

Optionally, the bearer layer further includes a polarized part, and the polarized part is disposed on a periphery of the non-polarized part. A material constituting the polarized part is a polarized material.

Optionally, a thickness of the bearer layer is between 50 µm and 200 µm. This helps manufacture the non-polarized part, and avoids occurrence of a segment difference to avoid unflatness of a location of the non-polarized part.

Optionally, an area of the non-polarized part is between 25 mm$^2$ and 144 mm$^2$. This can minimize an area of a fingerprint recognition region while implementing a fingerprint recognition function.

Optionally, a contour of the non-polarized part coincides with a contour of the peripheral region. This can reduce, to a maximum extent, a filtering function of the bearer layer on displayed light, thereby improving a display effect and reducing power consumption.

Based on this, optionally, a material constituting the non-polarized part is a non-polarized material.

Optionally, the mobile terminal further includes a polarization layer disposed between the display panel and the bearer layer. A material constituting the non-polarized part is a polarized material. A fast axis direction of the non-polarized part is parallel to a polarization direction of the polarization layer, and a slow axis direction of the non-polarized part is perpendicular to the polarization direction of the polarization layer. Costs of the polarized material are lower than those of a non-polarized material.

Optionally, the mobile terminal further includes a polarization layer disposed between the display panel and the bearer layer. A material constituting the non-polarized part is a polarized material. A slow axis direction of the non-polarized part is parallel to a polarization direction of the polarization layer, and a fast axis direction of the non-polarized part is perpendicular to the polarization direction of the polarization layer. Costs of the polarized material are lower than those of a non-polarized material.

Optionally, the mobile terminal further includes a polarization layer disposed between the display panel and the bearer layer. A material constituting the non-polarized part is a polarized material. A fast axis direction and a slow axis direction of the non-polarized part each form an angle of 45° with a polarization direction of the polarization layer. Costs of the polarized material are lower than those of a non-polarized material.

Optionally, a thickness of the bearer layer is between 50 µm and 1000 µm. This not only can ensure a bearer capability of the non-polarized part, but also can thin and lighten the mobile terminal.

Optionally, the bearer layer has a transmittance greater than 95% and a haze less than 5%. This can ensure that a display effect meets a requirement.

Optionally, the non-polarized part includes at least one transparent film layer. A plurality of transparent film layers may cooperate with each other to form a non-polarized part with varying flexibility to meet various requirements.

Optionally, a material constituting the non-polarized part is a non-polarized material. The mobile terminal further includes a first transparent adhesive layer, and the first transparent adhesive layer is disposed between the bearer layer and the cover body. The transparent film layer that is in the non-polarized part and that is close to the first transparent adhesive layer is the same as a material of the first transparent adhesive layer. This can improve a connection effect between film layers.

Optionally, a material constituting the non-polarized part is a non-polarized material. The mobile terminal further includes a second transparent adhesive layer, and the second transparent adhesive layer is disposed between the bearer layer and the display panel. The transparent film layer that is in the non-polarized part and that is close to the second transparent adhesive layer is the same as a material of the second transparent adhesive layer. This can improve a connection effect between film layers.

According to a second aspect, a cover is provided, including: a cover body; a bearer layer, disposed on the cover body, where the bearer layer is located in a part of a transmissive region of the cover, the bearer layer includes a non-polarized part, and the non-polarized part is configured to enable a polarization direction of light before the light passes through the non-polarized part to be the same as a polarization direction of the light after the light passes through the non-polarized part; and an ink layer, disposed on a surface of the bearer layer, where the ink layer is located in a non-transmissive region of the cover. The ink layer is disposed on the bearer layer. In a manufacturing process, the ink layer may be coated on the bearer layer, and then the bearer layer coated with the ink layer is attached to the cover body, so as to revolve a problem that ink cannot be evenly coated when the ink is directly coated on the cover body. Based on this, the bearer layer includes the non-polarized part, and the non-polarized part does not change a polarization direction of light. Therefore, no loss is caused when light passes through the non-polarized part. When the cover is applied to a mobile terminal that has a front fingerprint recognition function, strength of a signal that finally reaches a photoelectric conversion apparatus can be improved, thereby ensuring a fingerprint recognition effect.

According to a third aspect, a display component is provided. The display component includes: a display panel; a bearer layer, disposed on a light emitting side of the display panel, where the bearer layer is located in a partial transmissive region of a display region of the display component, the bearer layer includes a non-polarized part, and the non-polarized part is configured to enable a polarization direction of light before the light passes through the non-polarized part to be the same as a polarization direction of the light after the light passes through the non-polarized part; and an ink layer, disposed on a surface of the bearer layer, where the ink layer is located in a peripheral region of the display component. The ink layer is disposed on the bearer layer. In a manufacturing process, the ink layer may be silkscreen printed on the bearer layer, and then the bearer layer on which the ink layer is silkscreen printed is attached to the display panel, so as to revolve a problem that ink cannot be evenly coated when the ink is directly coated on the cover. Based on this, the bearer layer includes the non-polarized part, and the non-polarized part does not change a polarization direction of light. Therefore, no loss is caused when light passes through the non-polarized part. When the display component is applied to a mobile terminal that has a front fingerprint recognition function, strength of a signal that finally reaches a photoelectric conversion apparatus can be improved, thereby ensuring a fingerprint recognition effect.

BRIEF DESCRIPTION OF DRAWINGS

FIG. 12b is a sectional view obtained through sectioning in an A-A' direction in FIG. 12a;

FIG. 13 is another sectional view obtained through sectioning in an A-A' direction in FIG. 12a;

FIG. 14b is a schematic diagram of a direction of each side of the mobile terminal shown in FIG. 14a;

FIG. 21b is a sectional view obtained through sectioning in a B-B' direction in FIG. 21a;

DETAILED DESCRIPTION OF EMBODIMENTS

Unless otherwise defined, the technical terms or scientific terms used in this application shall be a general meaning understood by a person skilled in the art. The terms "first", "second", and similar words used in the specification and claims of this application do not mean any order, quantity, or importance, but are merely intended to distinguish between different components. Therefore, a feature limited by "first" or "second" may explicitly or implicitly include one or more features. In the description of the embodiments of this application, unless otherwise stated, "a plurality of" means two or more.

The direction terms such as "left", "right", "up", and "down" are defined relative to schematic placement directions of a display apparatus in the accompanying drawings. It should be understood that these direction terms are relative concepts and are used to describe and clarify a relative direction, and may be correspondingly changed based on a change in the placement direction of the display apparatus.

Figure 1:
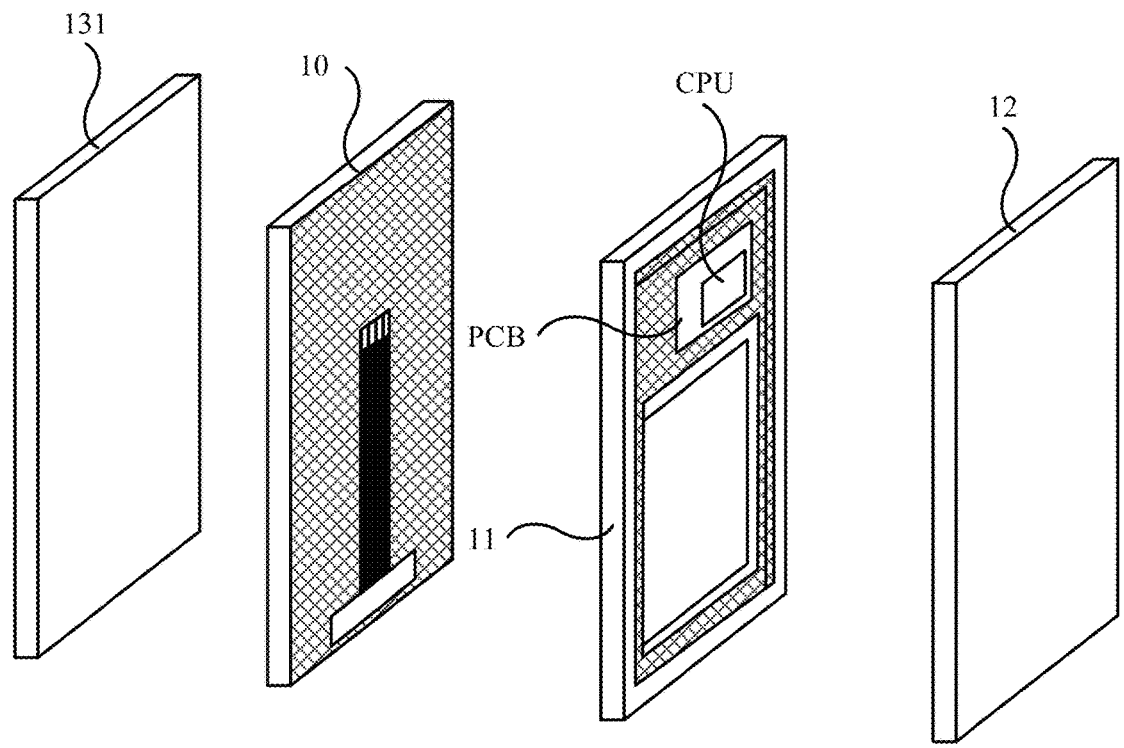
FIG. 1 is a schematic structural diagram of a mobile terminal according to an embodiment of this application.

An embodiment of this application provides a mobile terminal 01 shown in FIG. 1. The mobile terminal 01 includes, for example, a mobile phone, a tablet computer, a personal digital assistant (PDA), and an in-vehicle computer. A specific form of the mobile terminal 01 is not particularly limited in this embodiment of this application. For ease of description, an example in which the mobile terminal 01 is a mobile phone is used below for description.

As shown in FIG. 1, the mobile terminal 01 mainly includes a display unit 10, a middle frame 11, a housing 12, and a cover body 131. The display unit 10 and the middle frame 11 are disposed in the housing 12.

The middle frame 11 is located between the display unit 10 and the housing 12. The middle frame 11 is away from a surface of the display unit 10 and is configured to install internal elements such as a battery, a printed circuit board (PCB), a camera, and an antenna.

The mobile terminal 01 further includes a central processing unit (CPU) disposed on the PCB.

The cover body 131 is located on a side that is of the display unit 10 and that is away from the middle frame 11. The cover body 131 may be, for example, cover glass (CG), and the cover glass may have specific toughness.

The display unit 10 has a light emitting side on which a displayed picture can be seen and a back side that is disposed opposite to the light emitting side. The back side of the display unit 10 is close to the middle frame 11, and the cover body 131 is disposed on the light emitting side of the display unit 10.

Figure 2:
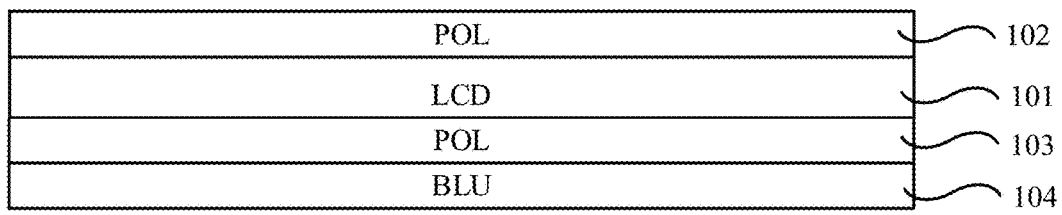
FIG. 2 is a schematic structural diagram of a display unit according to an embodiment of this application.

As shown in FIG. 2, the display unit 10 includes a display panel (DP) 101.

In some embodiments of this application, as shown in FIG. 2, the display panel 101 may be a liquid crystal display (LCD) panel. In this case, the display unit 10 further includes a first polarization layer 102 close to the light emitting side of the display panel 101, and a second polarization layer 103 close to the back side of the display panel 101. The two polarization layers are configured to provide, for the liquid crystal display panel, a backlight unit (BLU) 104 of a light source.

Figure 3:
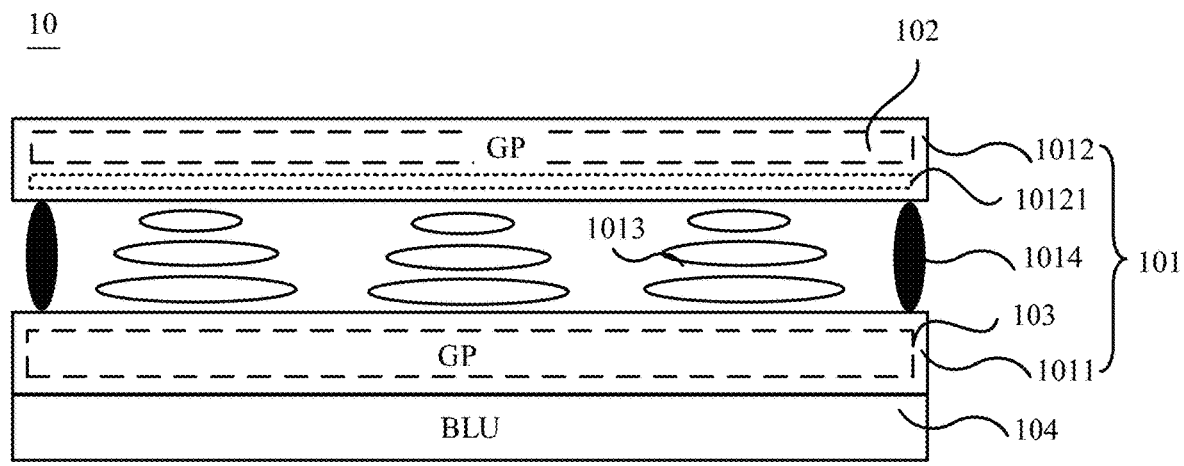
FIG. 3 is a schematic structural diagram of another display unit according to an embodiment of this application.

As shown in FIG. 3, the liquid crystal display panel includes an array substrate 1011, an alignment substrate 1012, and a liquid crystal layer 1013. The liquid crystal layer 1013 is disposed between the array substrate 1011 and the alignment substrate 1012. The array substrate 1011 and the alignment substrate 1012 are matched together by using a frame sealant 1014, so that the liquid crystal layer 1013 is limited in a liquid crystal cell surrounded by the array substrate 1011, the alignment substrate 1012, and the frame sealant 1014.

To enable the liquid crystal display panel to implement color display, as shown in FIG. 3, the liquid crystal display panel further includes a color filter layer 10121. The color filter layer 10121 may be disposed on the alignment substrate 1012. In this case, the alignment substrate 1012 may be referred to as a color film substrate.

As shown in FIG. 2, the first polarization layer 102 in the liquid crystal display panel may be a manufactured polarizer. In this case, the polarizer may be attached to a surface of the light emitting side of the display panel 101.

Alternatively, as shown in FIG. 3, the first polarization layer 102 may be a wire grid polarization layer (GP). For example, in a process of manufacturing the alignment substrate 1012, the wire gate polarization layer may be integrated into the alignment substrate 1012 through sputtering, nanoimprinting, photolithography, or the like.

A material constituting the wire grid polarization layer may be a metal. For example, the material constituting the wire gate polarization layer includes but is not limited to aluminum (Al), copper (Cu), silver (Ag), gold (Au), chromium (Cr), and the like.

In addition, as shown in FIG. 2, the second polarization layer 103 may be a manufactured polarizer. In this case, the second polarization layer 103 is disposed on a surface of the back side of the display panel 101.

Alternatively, as shown in FIG. 3, the second polarization layer 103 may be a wire gate polarization layer integrated into the array substrate 1011 in a process of manufacturing the array substrate 1011.

A display principle of the mobile terminal 01 including the liquid crystal display panel is as follows: The backlight unit 104 emits white light, and white polarized light with a specific polarization direction is formed after the white light passes through the second polarization layer 103. The white polarized light is irradiated into the array substrate 1011, and then is filtered by using the liquid crystal layer 1013 and the color filter layer that is on the alignment substrate 1012 to form a polarized light with three primary colors: red, green, and blue.

When a polarization direction of the polarized light is perpendicular to a polarization direction of the first polarization layer 102, the polarized light cannot pass through the first polarization layer 102, and no light is emitted in this case.

When the polarization direction of the polarized light is parallel to the polarization direction of the first polarization layer 102, the polarized light can pass through the first polarization layer 102, and emitted light has strongest light intensity in this case.

Because a liquid crystal molecule in the liquid crystal layer 1013 has an optical rotation feature on the polarized light, a specific molecular arrangement direction may change the polarization direction of the polarized light. A polarized light direction of a liquid crystal molecule in each sub pixel is changed by using a pixel circuit on the array substrate 1011, so that an angle between the polarized light and the first polarization layer 102 can be controlled, so as to control a quantity of sub pixels, in all the sub pixels, that are emitted from the first polarization layer 102, to display images of different grayscales.

Therefore, the mobile terminal 01 including the liquid crystal display panel controls, under joint action of the first polarization layer 102, the second polarization layer 103, and the liquid crystal layer 1013, an amount of light that is emitted from the backlight unit 104 through the first polarization layer 102, to complete display.

Figure 4:
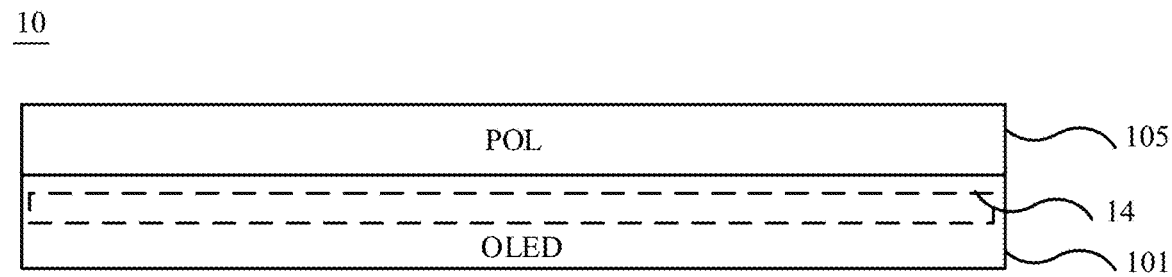
FIG. 4 is a schematic structural diagram of still another display unit according to an embodiment of this application.

Alternatively, in some other embodiments of this application, as shown in FIG. 4, the display panel 101 is an organic light emitting diode (OLED) display panel. In this case, the display unit 10 further includes a third polarization layer 105. The OLED display panel can emit light, and therefore the BLU does not need to be disposed in the display unit 10.

Figure 5:
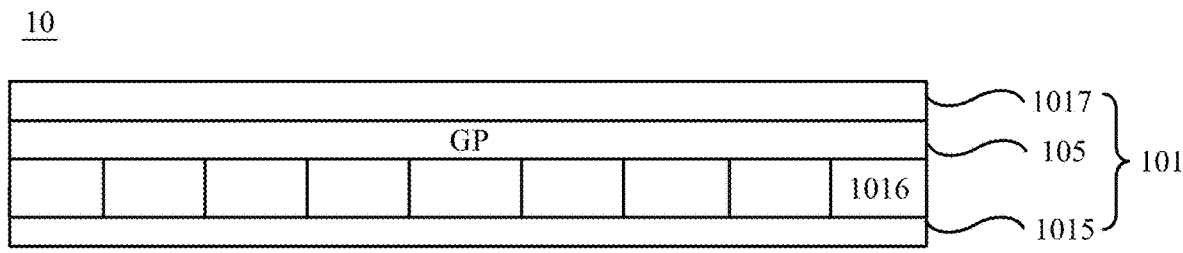
FIG. 5 is a schematic structural diagram of still another display unit according to an embodiment of this application.

As shown in FIG. 5, the OLED display panel includes a substrate 1015, a plurality of OLED elements 1016 disposed on the substrate 1015, and an encapsulation layer 1017 disposed on a side that is of the OLED element 1016 and that is away from the substrate 1015.

As shown in FIG. 4, the third polarization layer 105 may be a polarizer. In this case, the third polarization layer 105 is disposed on a surface of the light emitting side of the display panel 101.

Alternatively, as shown in FIG. 5, the third polarization layer 105 may be a wire gate polarization layer, and the wire gate polarization layer is integrated into the display panel 101. In this case, to ensure that the wire gate polarization layer can fulfill a function of changing a polarization direction of light, the wire gate polarization layer is disposed on the side that is of the OLED element 1016 and that is away from the substrate 1015.

It should be noted that the substrate 1015 in the OLED display panel may be made of a flexible resin material. In this case, the OLED display panel is a flexible display panel.

Alternatively, the substrate 1015 in the OLED display panel may be made of a relatively rigid-textured material, such as glass. In this case, the OLED display panel is a rigid display panel.

A light emitting principle of the mobile terminal 01 including the OLED display panel is as follows: Natural light emitted from the OLED element 1016 passes through the third polarization layer 105 to form display light with a single polarization direction, so as to implement clear display. Luminance of light emitted from each OLED element 1016 can be controlled by controlling a size of an electrical signal that is input to the OLED element 1016.

With diversification of functions of the mobile terminal 01, to prevent information disclosure, as shown in FIG. 4, a photoelectric conversion apparatus 14 is integrated into the mobile terminal 01 to verify identity. For example, the photoelectric conversion apparatus is configured to implement facial recognition or fingerprint recognition. For ease of description, an example in which the photoelectric conversion apparatus 14 is configured to implement fingerprint recognition is used below for description.

Figure 6A:
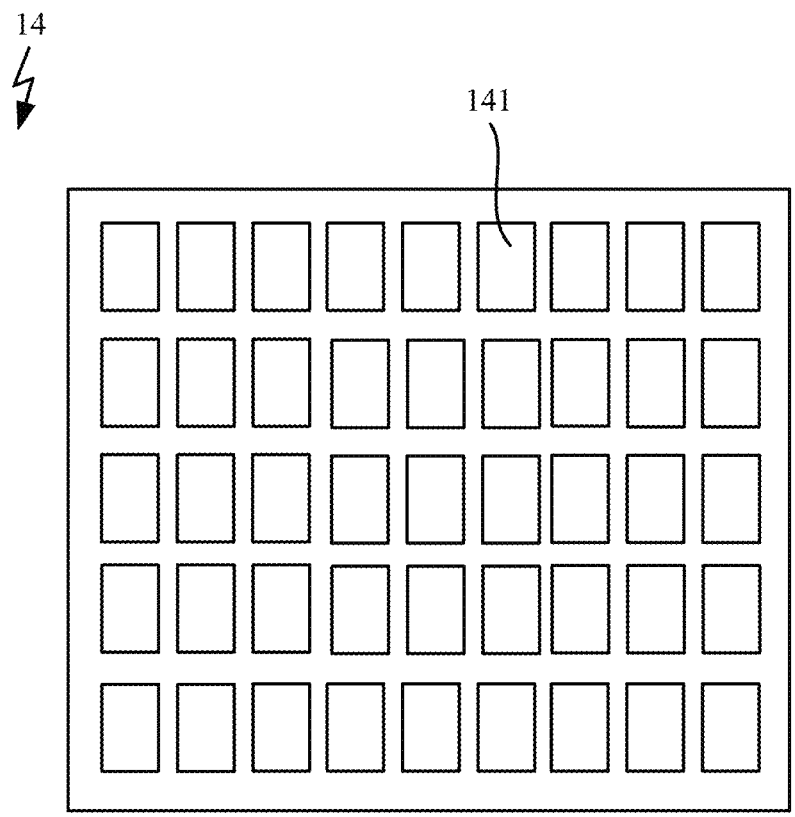
FIG. 6a is a schematic structural diagram of a photoelectric conversion apparatus according to an embodiment of this application.
Figure 6B:
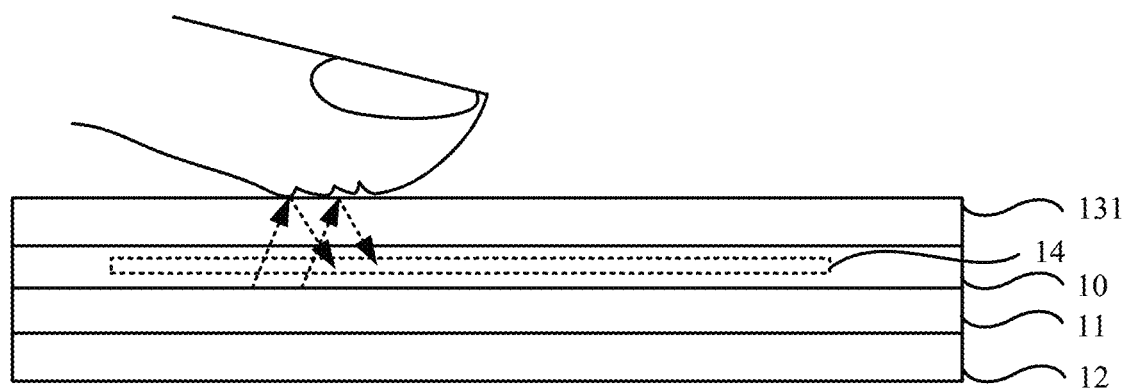
FIG. 6b is a schematic diagram of a fingerprint recognition process according to an embodiment of this application.

As shown in FIG. 6a, the photoelectric conversion apparatus 14 includes a plurality of light sensitive components 141 arranged in arrays. As shown in FIG. 6b, a fingerprint recognition principle of the photoelectric conversion apparatus 14 is as follows: A fingerprint includes a valley line and a ridge line. When a finger is placed on the cover body 131, the ridge line in the fingerprint is in contact with the cover body 131, and air exists between the valley line and the cover body 131.

After light emitted from the display unit 10 is irradiated on the finger, although the light is refracted at both the valley line and the ridge line, after the light is refracted at the valley line and the ray ridge line, intensity of reflected light is different on reflected optical paths of the valley line and the ridge line because a refractive index of the air is different from that of the finger. Therefore, each light sensitive component 141 in the photoelectric conversion apparatus 14 obtains distribution of valley lines and ridge lines of the fingerprint based on luminance of received reflected light, to implement fingerprint recognition.

One implementation of the fingerprint recognition function of the mobile terminal 01 is a full-panel fingerprint recognition function, and the other implementation is a local fingerprint recognition function.

The following describes an example of a disposing manner of the photoelectric conversion apparatus 14 in the display panel 101 when the mobile terminal 01 has a full-panel fingerprint recognition function.

Figure 7A:
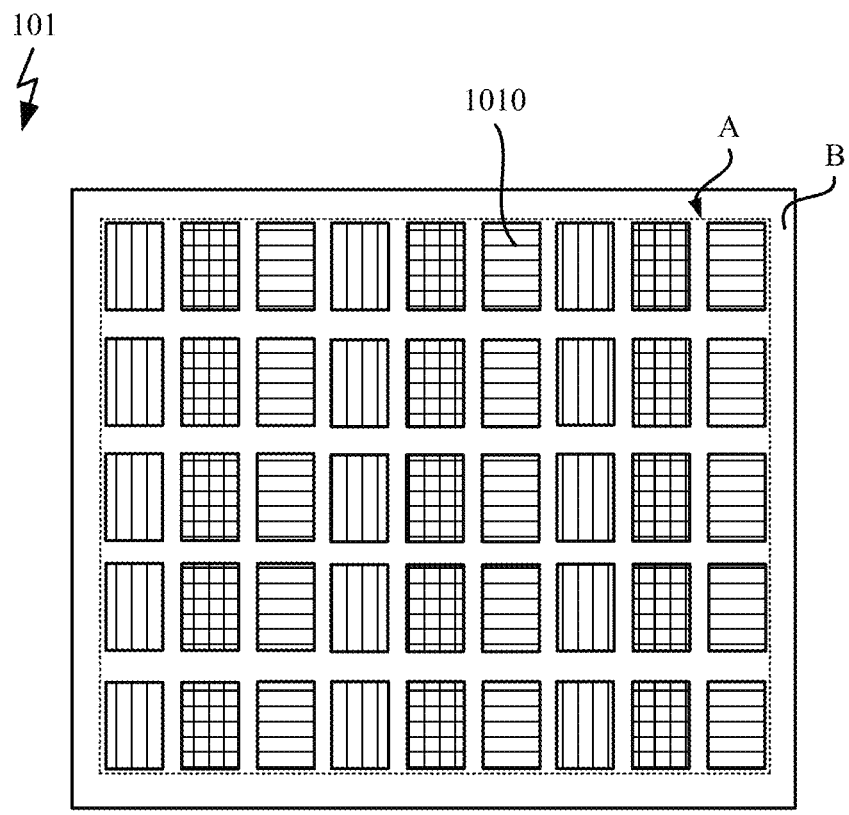
FIG. 7a is a schematic structural diagram of a display panel according to an embodiment of this application.

In some embodiments of this application, as shown in FIG. 7a, the display panel 101 includes a plurality of pixels, each pixel includes a plurality of sub pixels 1010, and the plurality of sub pixels 1010 include a first color sub pixel, a second color sub pixel, and a third color sub pixel. For example, a first color is red, a second color is green, and a third color is blue. A region surrounded by the sub pixels 1010 forms a display region A of the mobile terminal 01, and a region located on a periphery of the display region A is used as a peripheral region B of the mobile terminal 01.

Figure 7B:
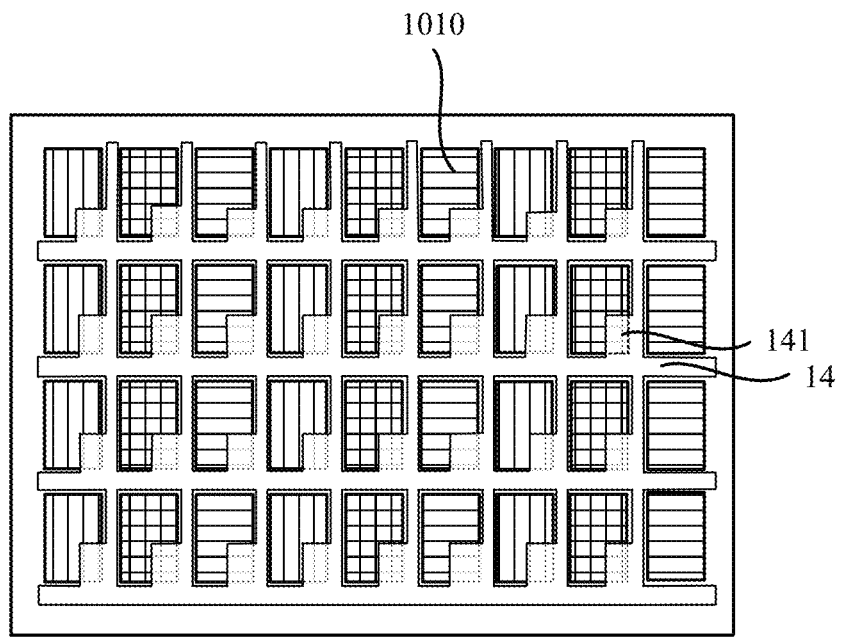
FIG. 7b is a schematic distribution diagram of a photoelectric conversion apparatus in a display panel according to an embodiment of this application.

In this case, as shown in FIG. 7b, the plurality of light sensitive components 141 in the photoelectric conversion apparatus 14 may be separately disposed in different sub pixels 1010. Certainly, to prevent the light sensitive component 141 from shielding displayed light, the light sensitive component 141 is in a transmissive structure.

In this case, the light sensitive components 141 in the photoelectric conversion apparatus 14 may be evenly distributed in the sub pixels 1010 of the display panel 101. When a user touches any location of the display panel 101, fingerprint recognition can be implemented, so that the mobile terminal 01 can have the full-panel fingerprint recognition function.

Figure 7C:
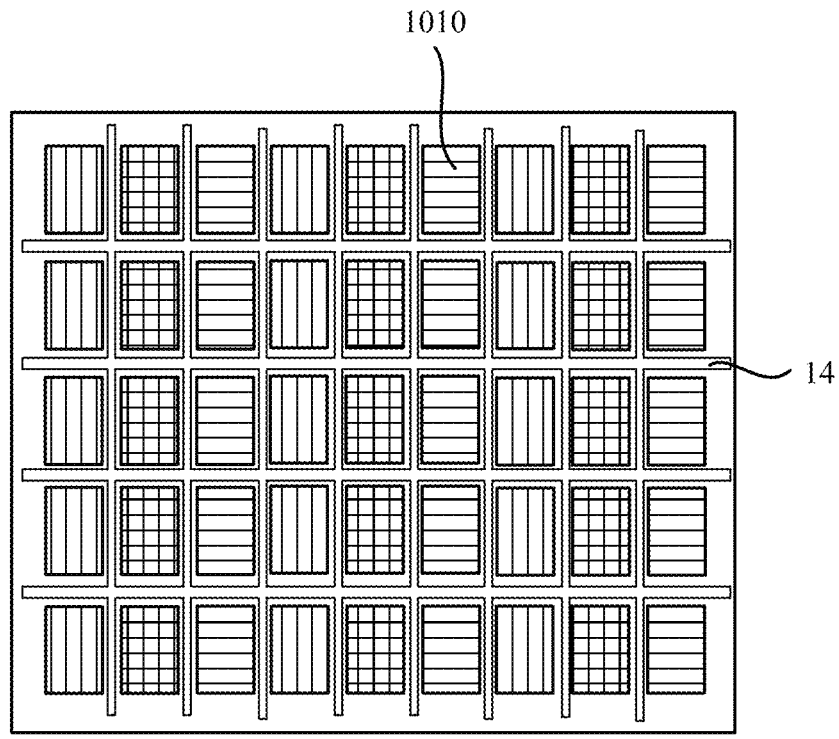
FIG. 7c is another schematic distribution diagram of a photoelectric conversion apparatus in a display panel according to an embodiment of this application.

Certainly, as shown in FIG. 7c, the plurality of light sensitive components 141 in the photoelectric conversion apparatus 14 may be separately disposed between adjacent sub pixels 1010.

In this case, when a user touches each location of the display panel 101, light with a specific angle in light reflected back from a finger may pass through the sub pixel 1010 and is then irradiated on each light sensitive component 141. When the user touches any location of the display panel 101, fingerprint recognition can be implemented, so that the mobile terminal 01 can have the full-panel fingerprint recognition function.

Based on this, in a thickness direction of the mobile terminal 01, an orthographic projection of the photoelectric conversion apparatus 14 at least coincides with the display region A, and the projection of the photoelectric conversion apparatus 14 may alternatively cover the display region A. In other words, the photoelectric conversion apparatus 14 fills the entire display region A.

Figure 8A:
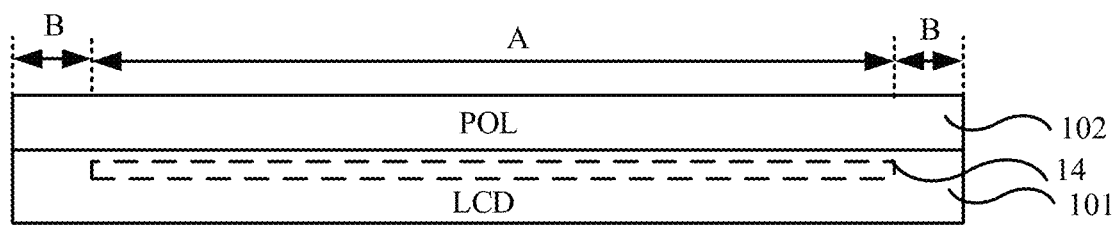
FIG. 8a is a schematic structural diagram of a photoelectric conversion apparatus in a display unit according to an embodiment of this application.

For example, as shown in FIG. 8a, the photoelectric conversion apparatus 14 may be integrated into the display panel 101.

Figure 8B:
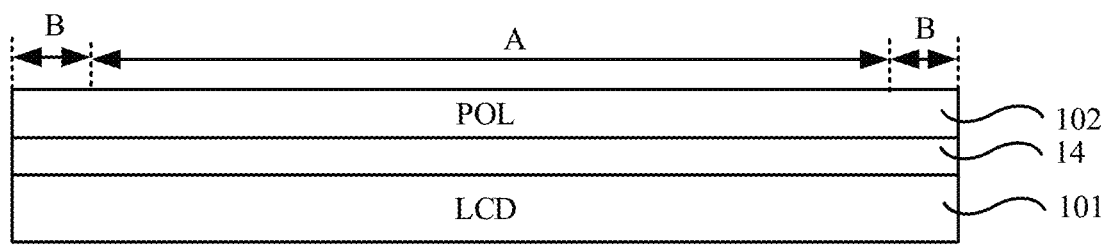
FIG. 8b is another schematic structural diagram of a photoelectric conversion apparatus in a display unit according to an embodiment of this application.

As shown in FIG. 8b, the photoelectric conversion apparatus 14 may be disposed on the light emitting side of the display panel 101.

Figure 8C:
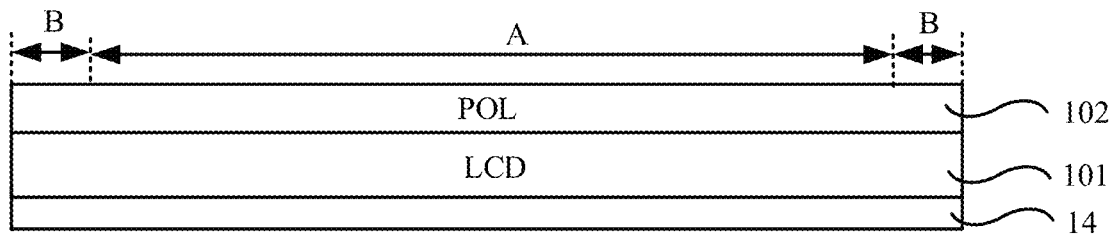
FIG. 8c is still another schematic structural diagram of a photoelectric conversion apparatus in a display unit according to an embodiment of this application.

As shown in FIG. 8c, the photoelectric conversion apparatus 14 may alternatively be disposed on the back side of the display panel 101.

In this case, the display panel 101 may be a liquid crystal display panel, or the display panel 101 may be an OLED display panel.

It should be noted that the backlight unit 104 is a light shielding component. Therefore, if a liquid crystal display unit wants to implement a full-panel fingerprint recognition function, the photoelectric conversion apparatus 14 cannot be located on a side that is of the backlight unit 104 and that is away from the display panel 101, and may be located between the backlight unit 104 and the display panel 101.

The following describes an example of a disposing manner of the photoelectric conversion apparatus 14 in the display panel 101 when the mobile terminal 01 has a local fingerprint recognition function.

Figure 9:
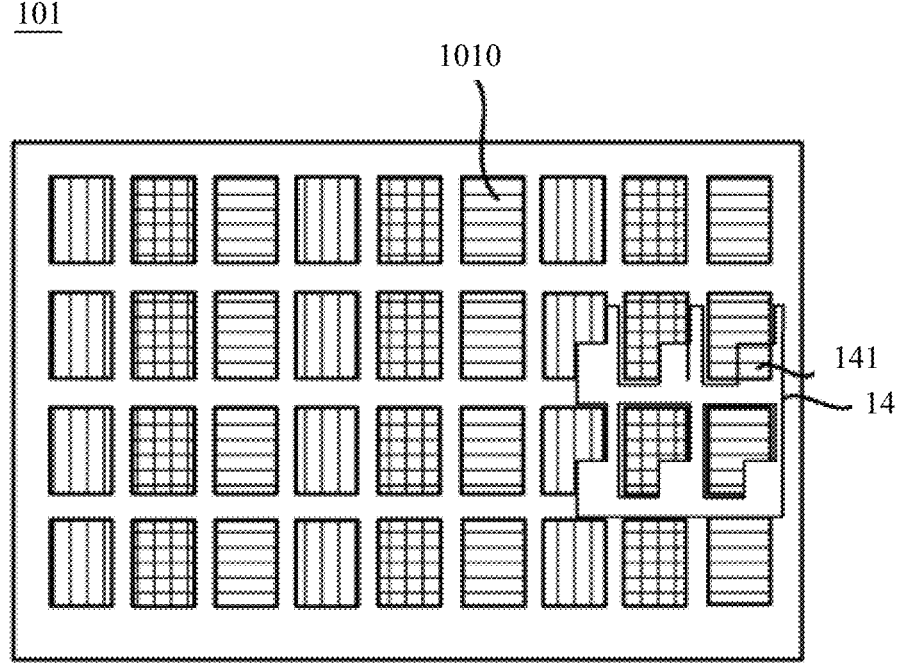
FIG. 9 is a still another schematic distribution diagram of a photoelectric conversion apparatus in a display panel according to an embodiment of this application.

In some other embodiments of this application, as shown in FIG. 9, the photoelectric conversion apparatus 14 is centrally disposed in a small block of region in the display region A of the mobile terminal 01. An orthographic projection of the photoelectric conversion apparatus 14 on the display panel 101 coincides with some sub pixels 1010 of the display panel 101, and all the light sensitive components 141 in the photoelectric conversion apparatus 14 cover only some sub pixels 1010 of the display panel 101, so that the mobile terminal 01 can have the local fingerprint recognition function.

Based on this, in a thickness direction of the mobile terminal 01, the projection of the photoelectric conversion apparatus 14 is located in the display region A. In other words, the orthographic projection of the photoelectric conversion apparatus 14 coincides with a part of the display region A, and does not fill the display region A.

Figure 10A:
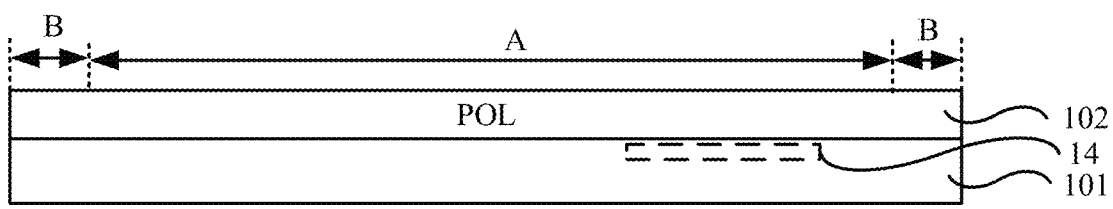
FIG. 10a is still another schematic structural diagram of a photoelectric conversion apparatus in a display unit according to an embodiment of this application.

For example, as shown in FIG. 10a, the photoelectric conversion apparatus 14 may be integrated into the display panel 101.

Figure 10B:
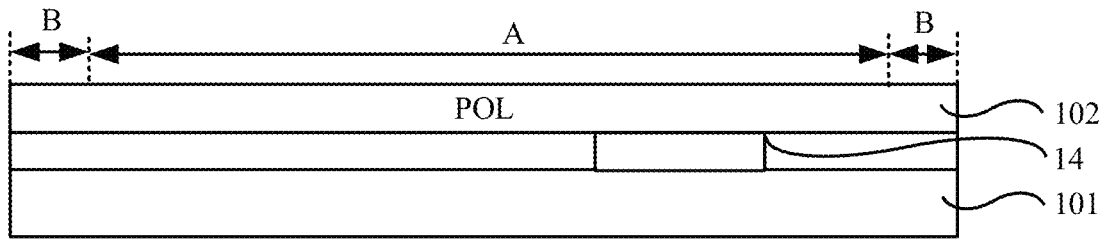
FIG. 10b is still another schematic structural diagram of a photoelectric conversion apparatus in a display unit according to an embodiment of this application.

As shown in FIG. 10b, the photoelectric conversion apparatus 14 may be disposed on the light emitting side of the display panel 101.

Figure 10C:
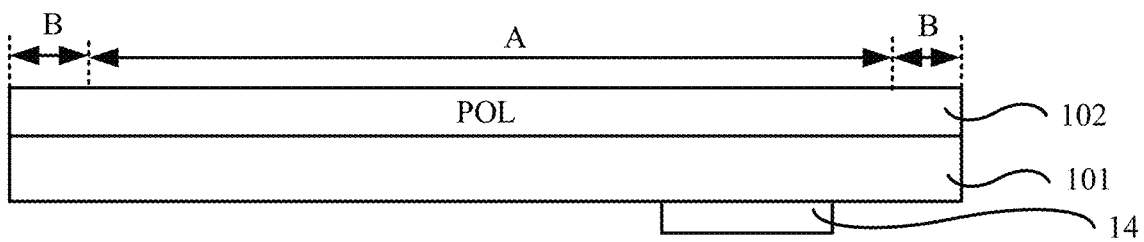
FIG. 10c is still another schematic structural diagram of a photoelectric conversion apparatus in a display unit according to an embodiment of this application.

As shown in FIG. 10c, the photoelectric conversion apparatus 14 may alternatively be disposed on the back side of the display panel 101.

In this case, the display panel 101 may be a liquid crystal display panel, or the display panel 101 may be an OLED display panel.

Figure 10D:
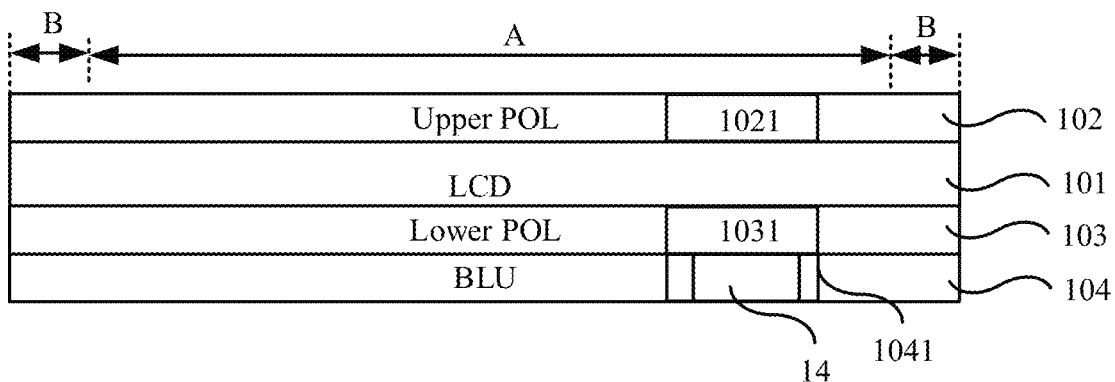
FIG. 10d is still another schematic structural diagram of a photoelectric conversion apparatus in a display unit according to an embodiment of this application.

For example, as shown in FIG. 10d, the display panel 101 is a liquid crystal display panel, and the photoelectric conversion apparatus 14 may be disposed on a side that is of the backlight unit 104 and that is away from the display panel 101. In this case, a through hole 1041 is disposed on the backlight unit 104, and the photoelectric conversion apparatus 14 is disposed in the through hole 1041. The photoelectric conversion apparatus 14 may be fastened to the display unit 10 or may be fastened to the middle frame 11 or the housing 12, provided that the photoelectric conversion apparatus 14 extends into the through hole 1041.

It can be understood that in this case, to avoid a filtering function of the first polarization layer 102 and the second polarization layer 103 on light irradiated on the photoelectric conversion apparatus 14, as shown in FIG. 10d, a first hole 1021 may be disposed on the first polarization layer 102, and a second hole 1031 may be disposed on the second polarization layer 103. In the thickness direction of the mobile terminal 01, an orthographic projection of the first hole 1021, an orthographic projection of the second hole 1031, and an orthographic projection of the through hole 1041 coincide with each other.

It can be understood that when the photoelectric conversion apparatus 14 is disposed in the through hole 1041 on the backlight unit 104, because the photoelectric conversion apparatus 14 does not shield displayed light, the photoelectric conversion apparatus 14 does not need to be limited to be transmissive.

In addition, the mobile terminal 01 includes a cover disposed on the light emitting side of the display panel 10.

The cover is configured to protect the display panel 10 and a circuit that are inside the mobile terminal 01.

Figure 11:
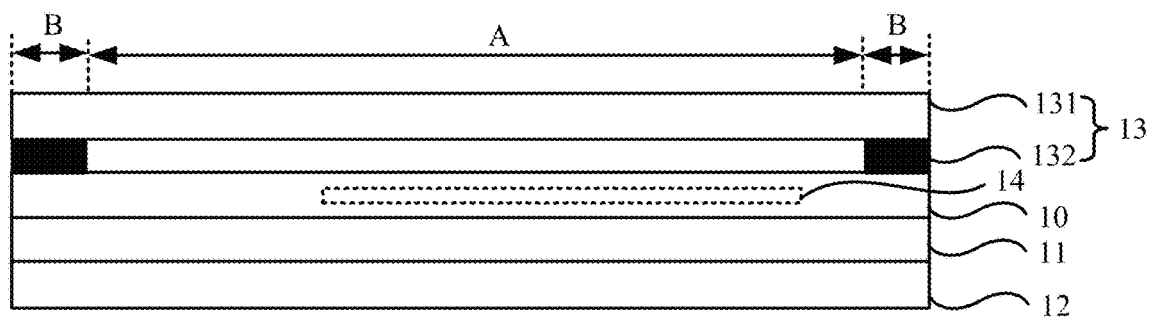
FIG. 11 is a schematic structural diagram of another mobile terminal according to an embodiment of this application.

As shown in FIG. 11, the cover 13 usually includes the cover body 131 shown in FIG. 1, and further includes an ink layer 132 disposed on the cover body 131. The ink layer 132 is located in the peripheral region B of the mobile terminal 01.

A specific color of the ink layer 132 is not limited in this embodiment of this application, for example, may be black, yellow, white, blue, or red.

Figure 12A:
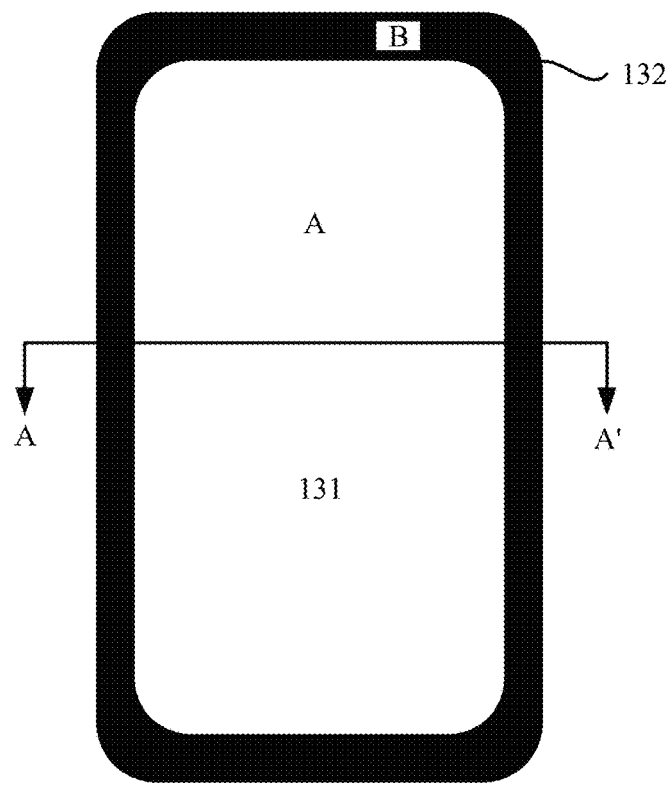
FIG. 12a is a schematic structural diagram of a cover according to an embodiment of this application.

In a top view of the cover 13 shown in FIG. 12a, a location of the ink layer 132 may shield the peripheral region B around the display region A, to ensure an appearance effect and display quality of the mobile terminal 01.

To reduce a probability that the ink layer 132 falls off, as shown in FIG. 11, the ink layer 132 is disposed on a side that is of the cover body 131 and that is close to the display unit 10.

Figure 12B:
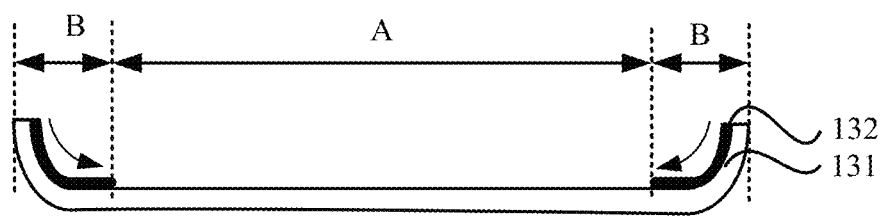

When the ink layer 132 is directly formed on the cover body 131 by using a silkscreen printing process, as shown in FIG. 12b (a sectional view obtained through sectioning in an A-A' direction in FIG. 12a), especially when the ink layer 132 is directly formed on a curved cover body, in one aspect, when the ink layer 132 is formed on a curved surface, uneven coating of the ink layer 132 is prone to occur due to the unsmooth surface. In another aspect, the ink layer 132 flows in an arrow direction in the figure, causing ink to pile up at a corner of the curved surface. As a result, a color difference occurs in each part of the ink layer 132.

Figure 13:
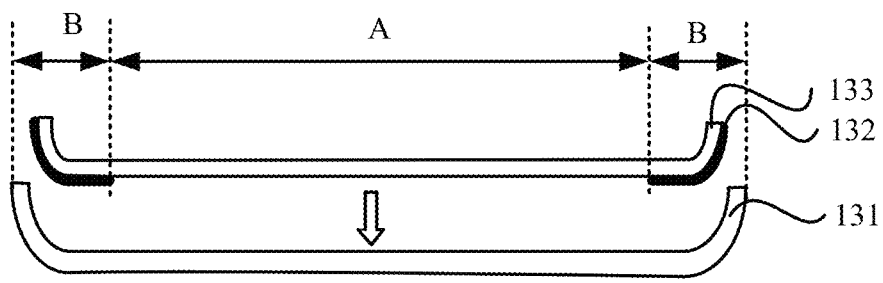

To resolve the problem, as shown in FIG. 13 (a sectional view obtained through sectioning in an A-A' direction in FIG. 12a), in some embodiments of this application, the ink layer 132 is first silkscreen printed on a polyethylene terephthalate (PET) film layer 133 by using the silkscreen printing process, and then the PET film layer 133 on which the ink layer 132 is silkscreen printed is attached to the cover body 131 by using a full lamination technology.

After the ink layer 132 is silkscreen printed on the flat PET film layer 133, the PET film layer 133 is attached to the cover body 131, to resolve a problem that ink is unevenly silkscreen printed, and prevent the ink from piling up. Costs of the PET film layer 133 are relatively low, and therefore manufacturing costs can be reduced.

However, the PET film layer 133 is a polarized film layer and has a polarization feature (e.g., a birefringence effect), and can change a polarization direction of light, causing a specific loss to light passing through the PET film layer 133.

For example, the display unit 10 of the mobile terminal 01 includes an OLED display panel, and the photoelectric conversion apparatus 14 is disposed on a back side of the OLED display unit. After the cover 13 to which the PET film layer 133 is attached is applied to the mobile terminal 01, a diagram of an optical path in a fingerprint recognition process is shown in FIG. 14a.

Figure 14A:
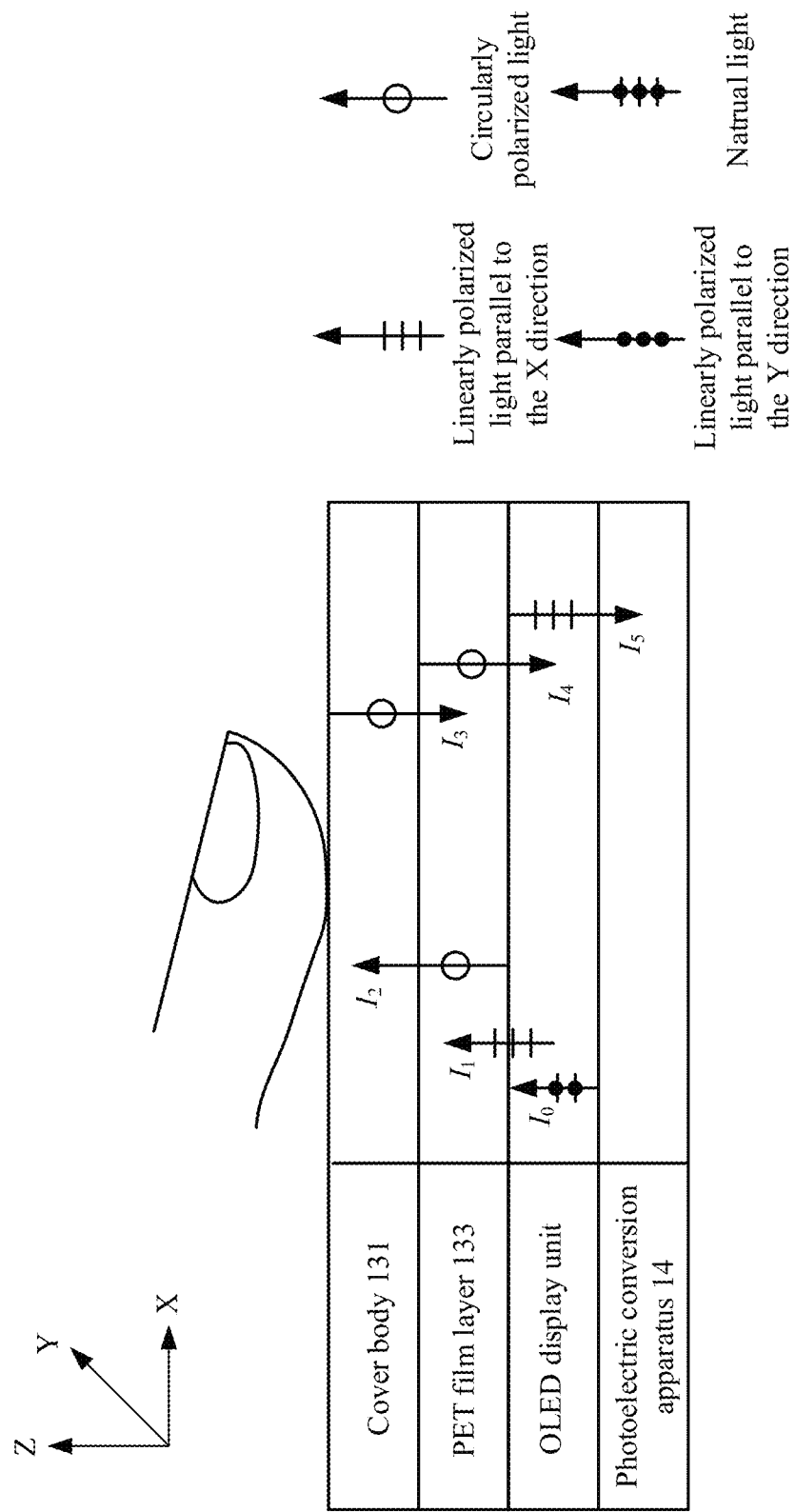
FIG. 14a is a diagram of an optical path in a fingerprint recognition process of a mobile terminal according to an embodiment of this application.
Figure 14B:
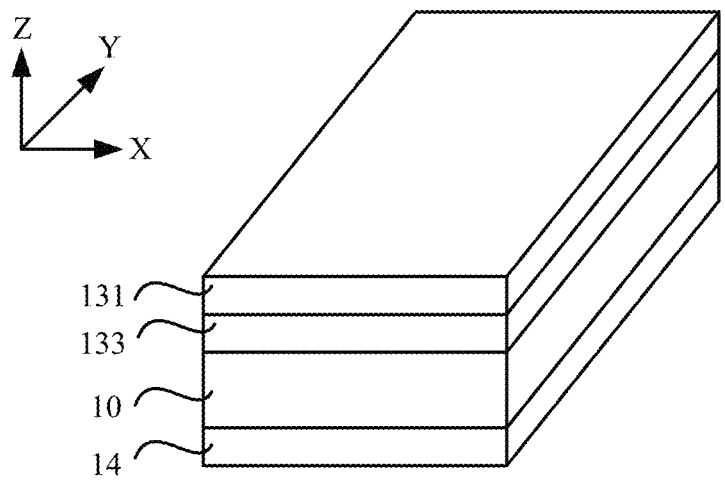

As shown in FIG. 14b, a Z direction in FIG. 14a is the thickness direction of the mobile terminal 01, and X, Y, and Z directions are perpendicular to each other. For example, the X direction is parallel to a short side of the mobile terminal 01, and the Y direction is parallel to a long side of the mobile terminal 02.

As shown in FIG. 14a, for example, a polarization direction of the third polarization layer 105 included in the OLED display unit is parallel to the X direction is used. Light $I_0$ emitted from the OLED element 1016 of the OLED display unit is natural light, and includes light parallel to the X direction and light parallel to the Y direction.

Linearly polarized light $I_1$ is formed after the self-illuminated light $I_0$ passes through the third polarization layer 105 (only the light parallel to the X direction can pass through the third polarization layer 105, and the light parallel to the Y direction cannot pass through the third polarization layer 105). When only a transmissive feature of light is considered without considering another light loss, light intensity is reduced by half to $I_1=\frac{1}{2}I_0$.

The PET film layer 133 is cut in an arbitrary direction, and usually has a birefringence effect. Therefore, the linearly polarized light $I_1$ changes to circularly polarized light $I_2$ due to the birefringence effect after passing through the PET film layer 133. Without considering absorption and according to the Malus's rule, corresponding light intensity changes to $I_2=I_o+I_e=I_1(\cos\theta)^2+I_1(\sin\theta)^2$, where $\theta$ is an angle between a light polarization direction of the incident linearly polarized light and the polarization direction of the third polarization layer 105, $I_o$ is referred to as an ordinary ray (also referred to as an o ray) complying with the law of refraction, and $I_e$ is referred to as an extraordinary ray (also referred to as an e ray) that does not comply with the law of refraction.

After being reflected by a finger on a surface of the cover body 131, the circularly polarized light $I_2$ is still maintained as circularly polarized light $I_3$. If a reflection coefficient of the cover body 131 is A, corresponding light intensity changes to $I_3=A*I_2=A*(I_o+I_e)$.

After passing through the PET film layer 133 again, the circularly polarized light $I_3$ is still maintained as circularly polarized light $I_4$, and corresponding light intensity changes to $I_4=I_3=A*I_o+A*I_e$.

When the circularly polarized light $I_4$ passes through the third polarization layer 105 again to enter the OLED element 1016, light in the Y direction cannot effectively pass through the third polarization layer 105, and only a part of the light can be projected. Light penetrating the third polarization layer 105 is linearly polarized light $I_5$, and corresponding light intensity changes to $I_5=A*I_o*(\cos\theta)^2+A*I_e*(\sin\theta)^2$. In this case, a correspondence between $I_5$ and $I_1$ is $I_5=A*I_1*(\cos\theta)^4+A*I_1*(\sin\theta)^4=A*I_1*[(\cos\theta)^4+(\sin\theta)^4]\le I_1*A$. When $\theta$ is 0° or 90°, $I_5=I_1*A$, and when $\theta$ is neither 0° or 90°, a light loss exists.

To be specific, light intensity of light irradiated on the photoelectric conversion apparatus 14 changes to $I_5=I_1*A*[(\cos\theta)^4+(\sin\theta)^4]$, a quantity of signals reflected by the finger decreases, and a signal finally reaching the photoelectric conversion apparatus 14 weakens, which affects a fingerprint recognition effect.

In addition, because the polarized film layer is cut in an arbitrary direction, normally, it is difficult to effectively control a polarization direction of the PET film layer. After the PET film layer 133 is cut, it cannot be ensured that polarization directions are consistent with each other in all parts on the PET film layer 133. As a result, a performance difference of the mobile terminal 01 cannot be controlled, and under-panel fingerprint unlock experience is further affected.

Figure 15:
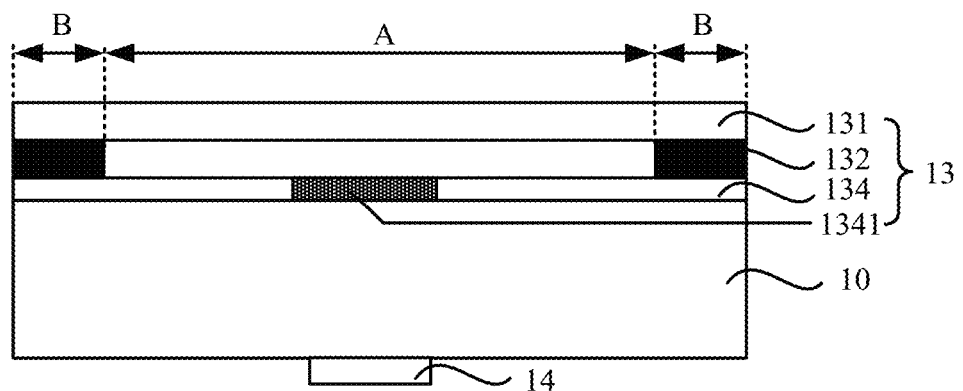
FIG. 15 is a schematic structural diagram of a cover and a display unit according to an embodiment of this application.

Based on the foregoing problem, as shown in FIG. 15, in some embodiments of this application, a bearer layer 134 may be disposed between the cover body 131 and the display unit 10. The bearer layer 134 faces the surface of the cover body 131 or faces the surface of the display unit 10. The ink layer 132 may be formed by using a silkscreen printing process, and the ink layer 132 is located in the peripheral region B of the mobile terminal 01.

The bearer layer 134 is located in a partial transmissive region of the display region A, and the bearer layer 134 includes a non-polarized part 1341. An orthographic projection of the photoelectric conversion apparatus 14 on the bearer layer 134 is located in an orthographic projection of the non-polarized part 1341. The non-polarized part 1341 is configured to enable a polarization direction of light before the light passes through the non-polarized part 1341 to be the same as a polarization direction of the light after the light passes through the non-polarized part 1341.

It can be understood that in a process of manufacturing the mobile terminal 01, finally there is a process of assembling the cover body 131 and the display unit 10. Therefore, in this application, the bearer layer 134 may be disposed on the cover body 131, and the cover body 131 on which the bearer layer 134 and the ink layer 132 are disposed is assembled with the display unit 10.

Alternatively, the bearer layer 134 may be disposed on the light emitting side of the display unit 10, and the display unit 10 on which the bearer layer 134 and the ink layer 132 are disposed is assembled with the cover body 131.

An example in which the display panel 101 included in the display unit 10 is an OLED display panel, and the photoelectric conversion apparatus 14 is disposed on a side that is of the OLED display panel and that is away from the cover 13 is used below for illustration. For another location relationship between the photoelectric conversion apparatus 14 and the OLED display panel, and a location relationship between the photoelectric conversion apparatus 14 and a liquid crystal display panel when the display panel 101 included in the display unit 10 is the liquid crystal display panel, reference may be made to the foregoing description, and details are not described herein again.

In the photoelectric conversion apparatus 14, a location of the light sensitive component 141 corresponds to a location of the non-polarized part 1341. Therefore, when the photoelectric conversion apparatus 14 is located in the display region A, the non-polarized part 1341 is located in the display region A. In this case, in the thickness direction of the mobile terminal 01, the orthographic projection of the photoelectric conversion apparatus 14 on the bearer layer 134 is located in the orthographic projection of the non-polarized part 1341 on the bearer layer 134.

It can be learned from above that the non-polarized part 1341 has a function of not changing a polarization direction of light. Regardless of whether light is emitted from a side of the display unit 10 to a side of the cover 13 or emitted from a side of the cover 13 to a side of the display unit 10, the light does not change from linearly polarized light to circularly polarized light, or does not change from polarized light parallel to a paper surface to polarized light perpendicular to the reference surface. Therefore, when only a transmissive feature of light is considered without considering another light loss, there is no light intensity loss when light passes through the non-polarized part 1341 once.

To ensure display quality, when a material of the bearer layer 134 is selected, optionally, the bearer layer 134 has a transmittance greater than 95% and a haze (haze) less than 5%.

In a process in which incident luminous flux leaves from an incident surface of a medium to an opposite emitting surface, a ratio of radiant energy projected on and passed through an object to total radiant energy projected on the object is referred to as a transmittance of the object. A higher transmittance indicates a better display effect and lower energy consumption. Therefore, the transmittance of the bearer layer 134 should be as high as possible, for example, may be 95.5%, 96.1%, 96.7%, 96.9%, 97%, 97.5%, 98.4%, 98.8%, 99.2%, or 99.6%.

The haze is a percentage occupied in total transmitted light intensity by intensity of transmitted light deviating from incident light by an angle of above 2.5°, and a larger haze indicates a reduction in film glossy, transparency, and imaging degree. Therefore, the haze of the bearer layer 134 should not be excessively large, for example, may be 4.5%, 4%, 3.8%, 3.3%, 2.9%, 2.6%, 2%, or 1%.

A structure of the mobile terminal 01 provided in this application is described below by using several examples.

In the following example, after the ink layer 132 is disposed on a surface that is of the bearer layer 134 and that is close to the cover body 131, and the bearer layer 134 is attached to the cover body 131, the cover 13 and the display unit 10 are attached to each.

Example 1

Figure 16A:
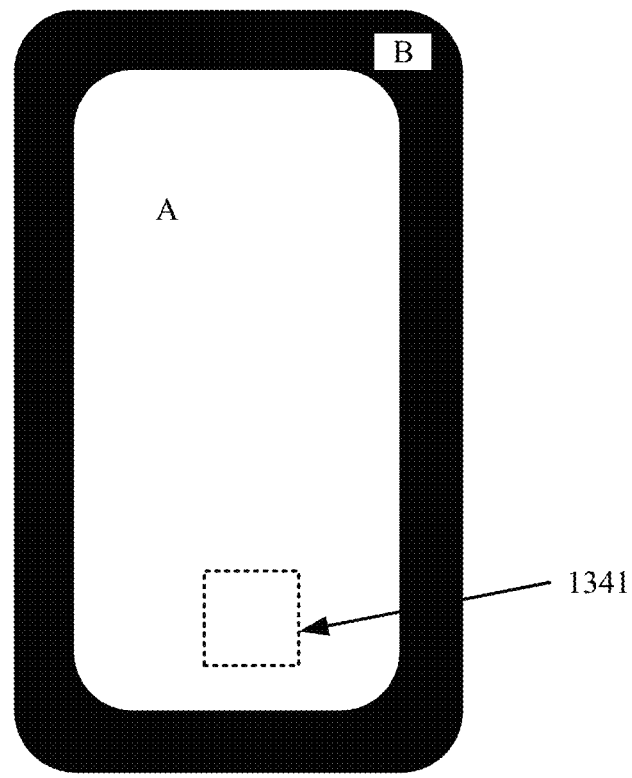
FIG. 16a is a diagram of a correspondence between a non-polarized part and a display region according to an embodiment of this application.

For a correspondence between the non-polarized part 1341 and the display region A, as shown in FIG. 16*a*, the non-polarized part 1341 is located in the display region A but does not cover the display region A.

In this example, as shown in FIG. 15, the mobile terminal 01 has a local fingerprint recognition function. For a disposing manner of the photoelectric conversion apparatus 14, reference may be made to the example of the disposing manner of the photoelectric conversion apparatus 14 in the display panel 101 when the mobile terminal 01 has the local fingerprint recognition function.

Figure 16B:
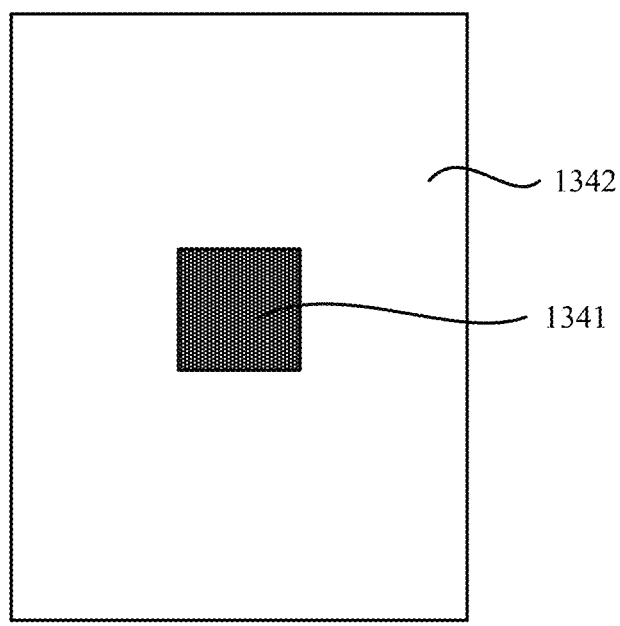
FIG. 16b is a schematic structural diagram of a bearer layer according to an embodiment of this application.

As shown in FIG. 16*b*, the bearer layer 134 further includes a polarized part 1342, and the polarized part 1342 is located on a periphery of the non-polarized part 1341. A material of the non-polarized part 1341 is a non-polarized material, and a material of the polarized part 1342 is a polarized material.

In other words, the polarized part 1342 on the bearer layer 134 has a birefringence effect, but the non-polarized part 1341 has no birefringence effect and does not change a polarization direction of light.

Figure 16C:
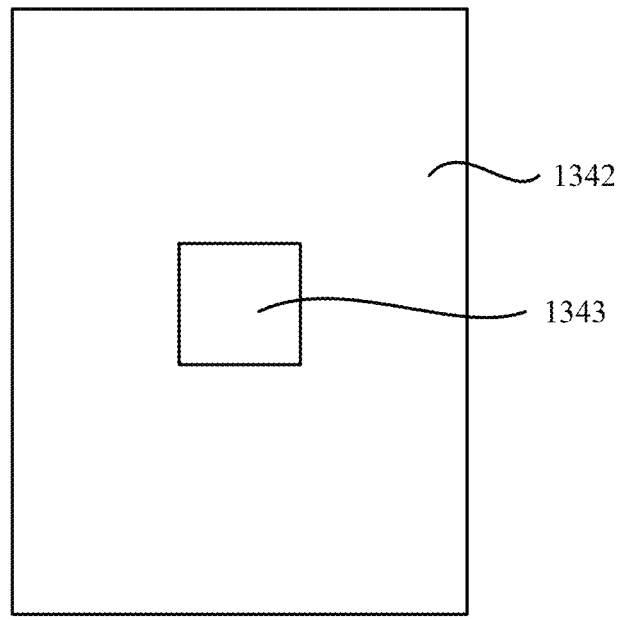
FIG. 16c is a schematic structural diagram of another bearer layer according to an embodiment of this application.

For a structure of the polarized part 1342, as shown in FIG. 16*c*, the polarized part 1342 includes a hollowed-out region 1343. As shown in FIG. 16*b*, the non-polarized part 1341 is disposed in the hollowed-out region 1343 to be seamlessly spliced with the polarized part 1342.

It can be understood that a structure manufactured by using a non-polarized material does not change a polarization direction of light, and a polarized material opposite to the non-polarized material may change a polarization direction of light.

The non-polarized material may include, for example, one of an optical transparent adhesive, optical transparent resin, polyimide, or polymethyl methacrylate.

Figure 17A:
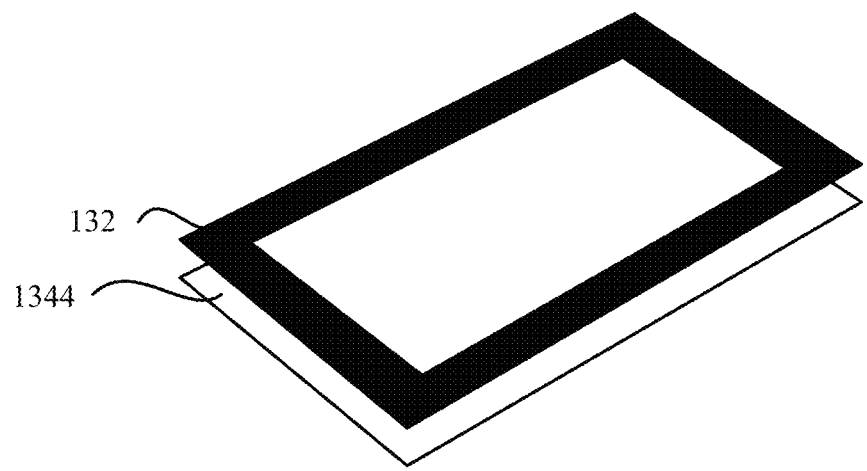
FIG. 17a to FIG. 17d are schematic diagrams of a cover manufacturing process according to an embodiment of this application.

In some embodiments, as shown in FIG. 17*a*, in a process of manufacturing the cover 13, the ink layer 132 is formed on a bearer film 1344 by using a silkscreen printing technology. The bearer film 1344 is in a complete-layer structure and does not include the hollowed-out region 1343, and a material of the bearer film 1344 is a polarized material.

Figure 17B:
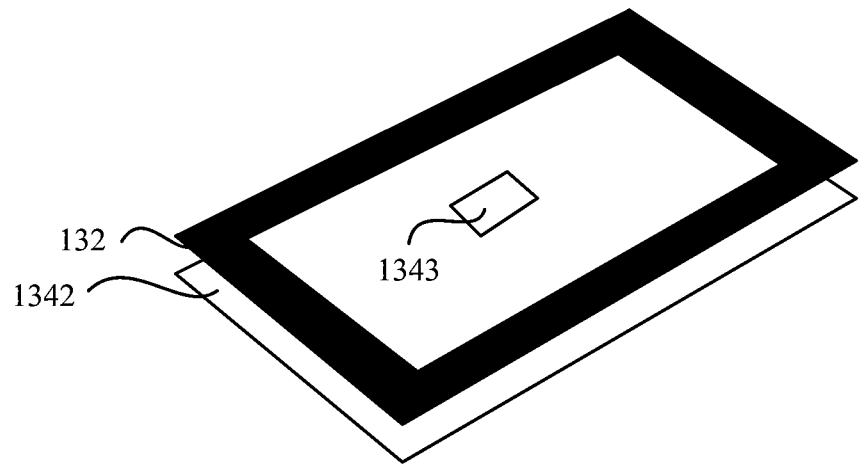

After silkscreen printing of the ink layer 132 is completed, as shown in FIG. 17*b*, the hollowed-out region 1343 is formed on the bearer film 1344, to form the polarized part 1342. For example, the hollowed-out region 1343 may be formed on the bearer film 1344 by using exposure, development, and etching processes.

Figure 17C:
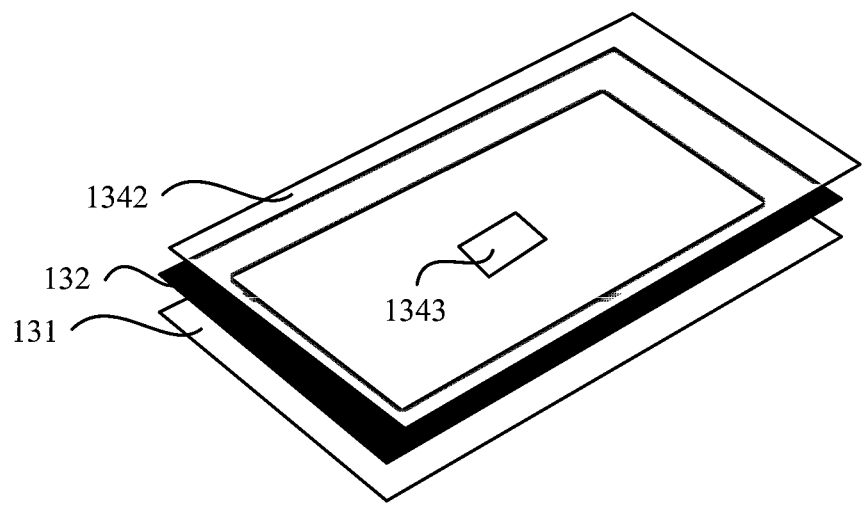

As shown in FIG. 17*c*, the polarized part 1342 on which the ink layer 132 is formed is attached to the cover body 131 by using a full lamination technology.

Figure 17D:
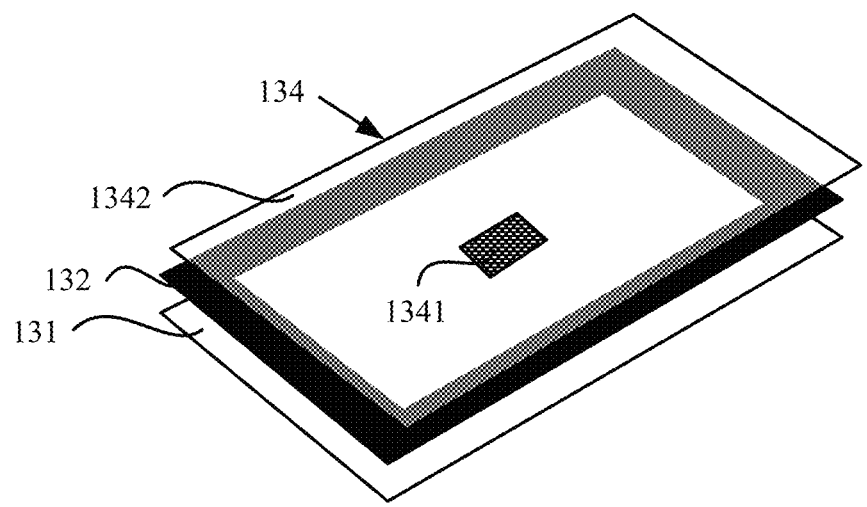

As shown in FIG. 17d, the hollowed-out region 1343 is filled with a non-polarized material to form the non-polarized part 1341, so as to manufacture the cover 13.

Figure 17E:
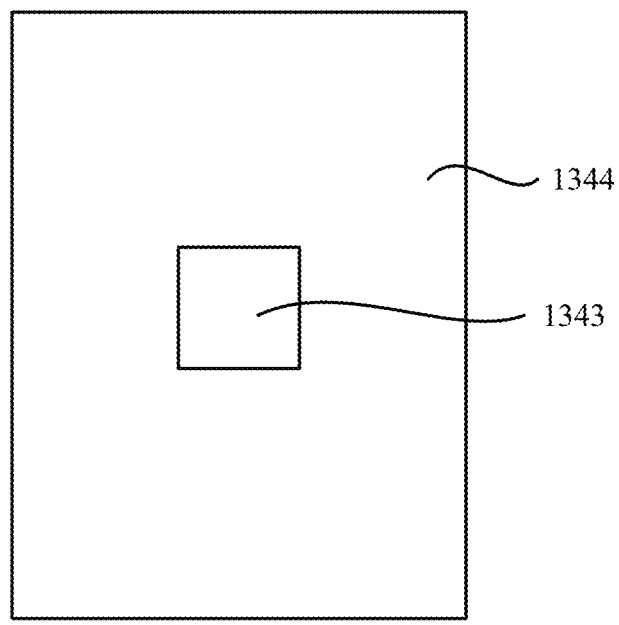
FIG. 17e is a schematic structural diagram of a polarized part according to an embodiment of this application.

In some embodiments, as shown in FIG. 17e, in a process of manufacturing the cover 13, the hollowed-out region 1343 is formed on the bearer film 1344 to form the polarized part 1342.

As shown in FIG. 17b, the ink layer 132 is formed in the polarized part 1342 by using a silkscreen printing technology.

After silkscreen printing of the ink layer 132 is completed, the polarized part 1342 is attached to the cover body 131.

As shown in FIG. 17d, the hollowed-out region 1343 is filled with a non-polarized material to form the non-polarized part 1341, so as to manufacture the cover 13.

Figure 18:
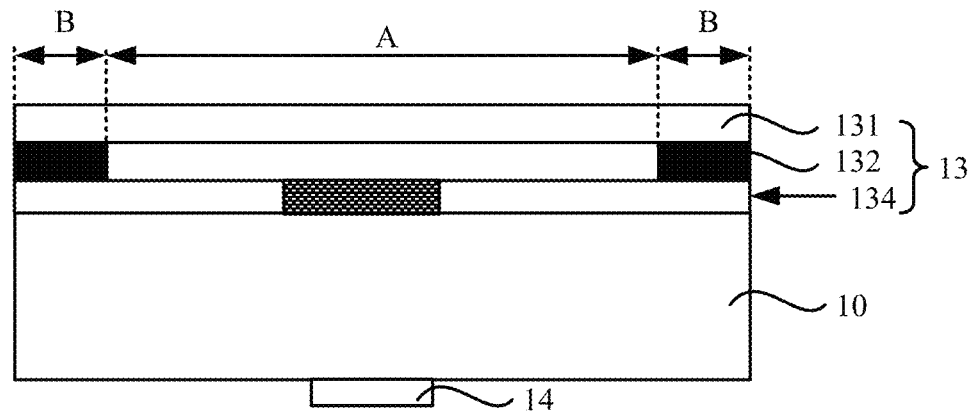
FIG. 18 is schematic structural diagram of another cover and display unit according to an embodiment of this application.

After the cover 13 is manufactured, the manufactured cover 13 and the display unit 10 are attached to each, to form the mobile terminal 01 shown in FIG. 18.

Figure 19:
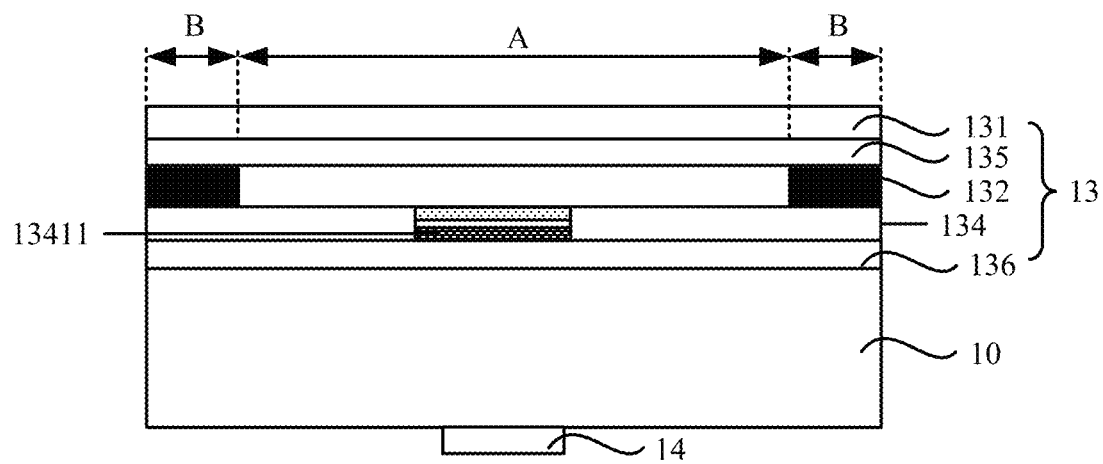
FIG. 19 is a schematic structural diagram of a non-polarized part including a plurality of transparent film layer according to an embodiment of this application.

In some embodiments, as shown in FIG. 19, the non-polarized part 1341 includes at least one transparent film layer 13411. An example in which the non-polarized part 1341 includes three transparent film layers 13411 is used for illustration in FIG. 19.

When the non-polarized part 1341 includes a plurality of transparent film layers 13411, materials of the plurality of transparent film layers 13411 are all non-polarized materials, and parameters such as thicknesses and the materials of the plurality of transparent film layers 13411 may be the same or may be different.

The non-polarized part 1341 is disposed as a structure including a plurality of transparent film layers 13411, and the plurality of transparent film layers 13411 may cooperate with each other to form a non-polarized part 1341 with varying flexibility, so as to meet a plurality of requirements.

In some embodiments, as shown in FIG. 19, the mobile terminal 01 may further include a first transparent adhesive layer 135 configured to bond the ink layer 132 and the cover body 131, and a second transparent adhesive layer 136 configured to bond the bearer layer 134 and the display unit 10.

To improve a connection effect between film layers, in some embodiments, the non-polarized part 1341 includes a transparent film layer 13411, and a material of the transparent film layer 13411 is the same as a material of the first transparent adhesive layer 135, or a material of the transparent film layer 13411 is the same as a material of the second transparent adhesive layer 136.

In some embodiments, the non-polarized part 1341 includes a plurality of transparent film layers 13411, and a material of the transparent film layer 13411 that is in the non-polarized part 1341 and that is close to the first transparent adhesive layer 135 is the same as a material of the first transparent adhesive layer 135.

In some embodiments, a material of the transparent film layer 13411 that is in the non-polarized part 1341 and that is close to the second transparent adhesive layer 136 is the same as a material of the second transparent adhesive layer 136.

To facilitate manufacturing of the non-polarized part 1341, and avoid a segment difference to avoid unflatness of a location of the non-polarized part 1341, optionally, a thickness of the bearer layer 134 is between 50 μm and 200 μm. For example, the thickness of the bearer layer 134 is 80 μm, 100 μm, 120 μm, or 150 μm.

To minimize an area of a fingerprint recognition region while implementing a fingerprint recognition function, in some embodiments, an area of the non-polarized part 1341 is between 25 mm² and 144 mm². A shape of the non-polarized part 1341 is not limited, for example, the non-polarized part 1341 is a rectangle of 10 mm×10 mm.

The cover body 131 may be a flexible cover body, or may be a rigid cover body.

Figure 20A:
FIG. 20a is a schematic structural diagram of a cover body according to an embodiment of this application.
Figure 20B:
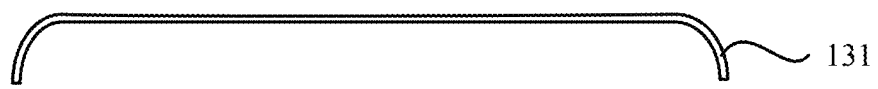
FIG. 20b is a schematic structural diagram of another cover body according to an embodiment of this application.

As shown in FIG. 20a, the cover body 131 may be a two-dimensional (2D) flat cover body. As shown in FIG. 20b, the cover body 131 may be a three-dimensional (3D) curved cover body.

Figure 21A:
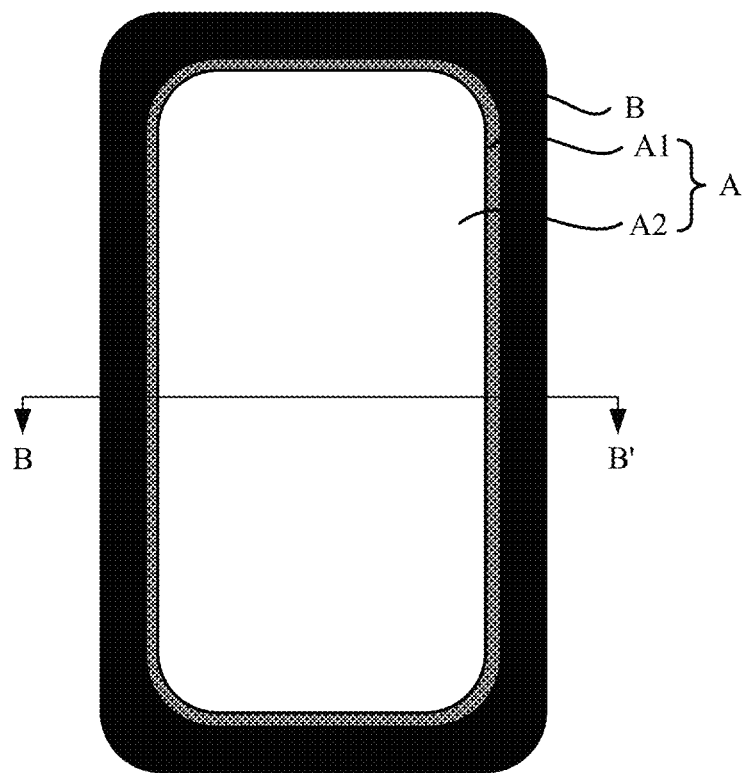
FIG. 21a is a schematic diagram of region division of a mobile terminal according to an embodiment of this application.

Based on this, in some embodiments, as shown in FIG. 21a, the display region A includes a dummy region A1 and a valid display region A2. In a display process, sub pixels 1010 located in the dummy region A1 display a black image, and sub pixels 1010 located in the valid display region A2 is configured to implement a display function of the mobile terminal 01.

It should be noted that in the display process, an electrical signal that drives the sub pixel 1010 to perform display first passes through the sub pixel 1010 located in the dummy region A1, and then enters the sub pixel 1010 located in the valid display region A2. A process in which the electrical signal passes through the dummy region A1 is also a step-by-step stabilization process, and the dummy region A1 may fulfill a function of stabilizing the electrical signal. In addition, the dummy region A1 is configured to define a boundary of the valid display region A2, and fulfills a locating function.

Figure 21B:
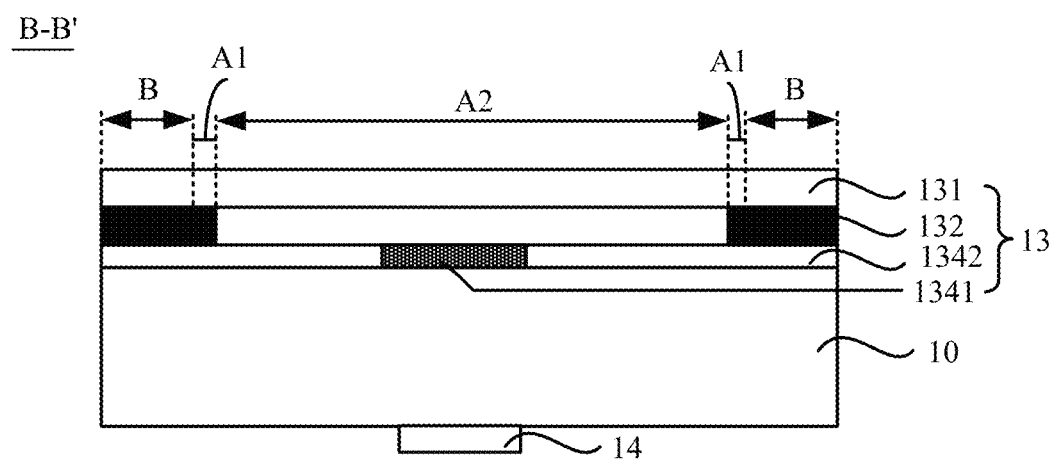

The ink layer 132 is disposed on the bearer layer 134. As shown in FIG. 21b (a sectional view obtained through sectioning in a B-B' direction in FIG. 21a), the ink layer 132 may extend into the dummy region A1.

Figure 22:
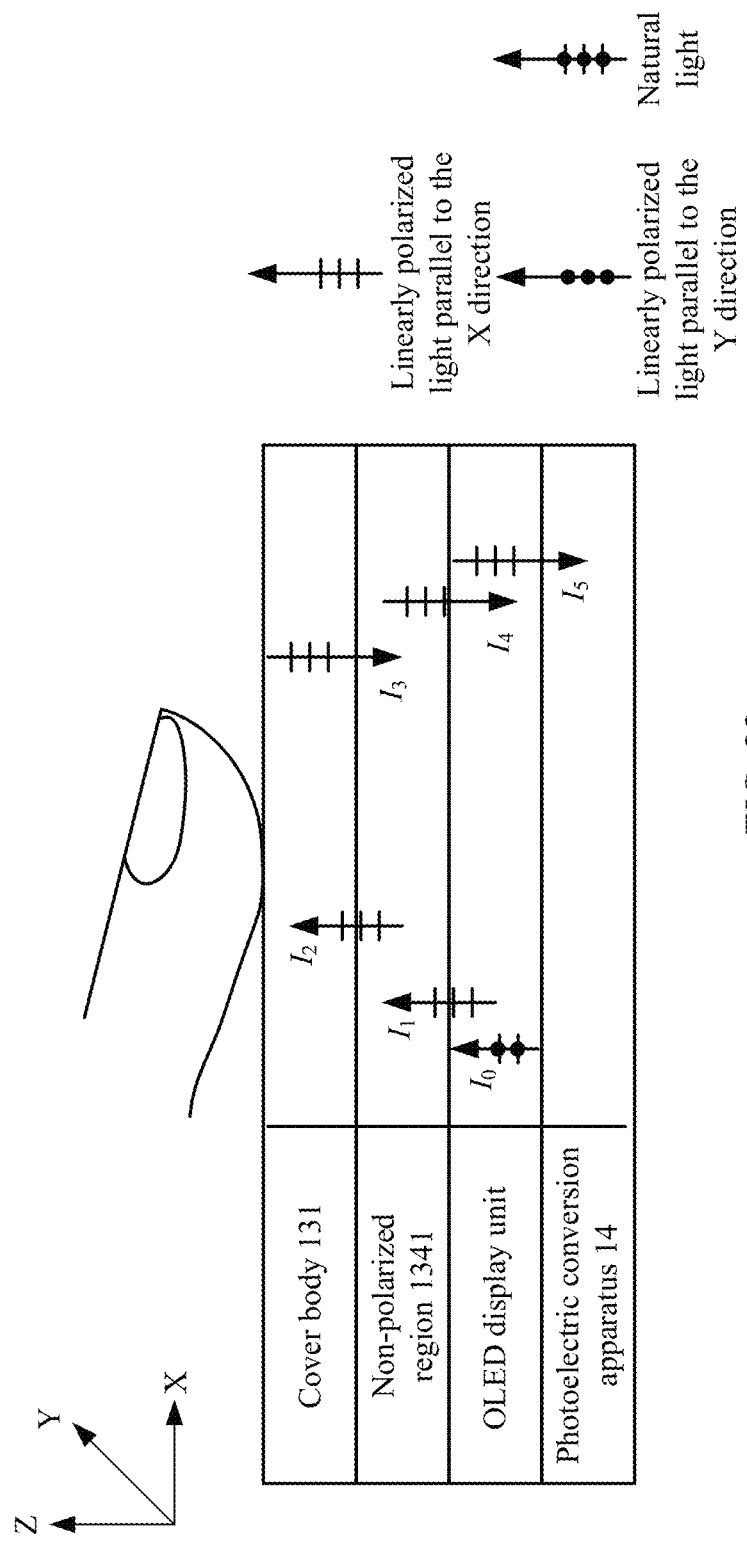
FIG. 22 is another diagram of an optical path in fingerprint recognition process of a mobile terminal according to an embodiment of this application.

Based on the mobile terminal, a diagram of an optical path in a fingerprint recognition process is shown in FIG. 22. X, Y, and Z directions in FIG. 22 are the same as the directions in FIG. 14b.

For example, a polarization direction of the third polarization layer 105 included in the OLED display unit is parallel to the X direction. Light $I_0$ emitted from the OLED element 1016 of the OLED display unit is natural light, and includes light parallel to the X direction and light parallel to the Y direction.

Linearly polarized light $I_1$ is formed after the self-illuminated light $I_0$ passes through the third polarization layer 105 (only the light in the X direction can pass through the third polarization layer 105, and the light in the Y direction cannot pass through the third polarization layer 105). When only a transmissive feature of light is considered without considering another light loss, light intensity is reduced by half to $I_1 = \tfrac{1}{2} I_0$.

The non-polarized part 1341 does not change a polarization direction of light. Therefore, after the linearly polarized light $I_1$ passes through the non-polarized part 1341 on the bearer layer 134, the light is still linearly polarized light $I_2$, and corresponding light intensity changes to $I_2 = I_1$.

After being reflected by a finger on a surface of the cover body 131, the linearly polarized light $I_2$ is still maintained as linearly polarized light $I_3$. If a reflection coefficient of the cover body 131 is A, corresponding light intensity changes to $I_3 = A*I_2$.

After passing through the non-polarized part 1341 on the bearer layer 134, the linearly polarized light $I_3$ is still maintained as linearly polarized light $I_4$, and corresponding light intensity changes to $I_4 = I_3$.

When the linearly polarized light $I_4$ passes through the third polarization layer 105 again to enter the OLED element 1016, because a polarization direction of the light always remains unchanged, there is no light intensity loss when the linearly polarized light $I_4$ passes through the third polarization layer 105 again. Light penetrating the third polarization layer 105 is linearly polarized light $I_5$, and corresponding light intensity changes to $I_5=I_4=A*I_1$.

To be specific, light intensity of light irradiated on the photoelectric conversion apparatus 14 changes to $I_5=I_4=A*I_1$, and no loss is caused when light passes through the non-polarized part 1341, so that strength of a signal that finally reaches the photoelectric conversion apparatus 14 can be improved, thereby ensuring a fingerprint recognition effect.

According to the mobile terminal 01 provided in this embodiment of this application, the ink layer 132 is disposed on the bearer layer 134. In a process of manufacturing the mobile terminal 01, after the ink layer 132 is silkscreen printed on the bearer layer 134, the bearer layer 134 on which the ink layer 132 is silkscreen printed is attached to the cover body 131 or the display unit 10, so as to avoid that ink cannot be evenly silkscreen printed when the ink is directly silkscreen printed on the cover body 131, to resolve problems such as a color difference in each part of the ink layer 132 or ink piling up at a corner of the curved cover body.

Based on this, the bearer layer 134 includes the non-polarized part 1341, and the non-polarized part 1341 does not change a polarization direction of light. Therefore, no loss is caused when light passes through the bearer layer 134, so that strength of a signal that finally reaches the photoelectric conversion apparatus 14 can be improved, thereby ensuring a fingerprint recognition effect.

In addition, the bearer layer 134 further includes the polarized part 1342. The material of the polarized part 1342 is a polarized material, and costs of the polarized material are relatively low. In this way, manufacturing costs can be reduced.

Example 2

A difference between this example and Example 1 lies in that the non-polarized part 1341 has a relatively large area and covers the display region A.

Figure 23A:
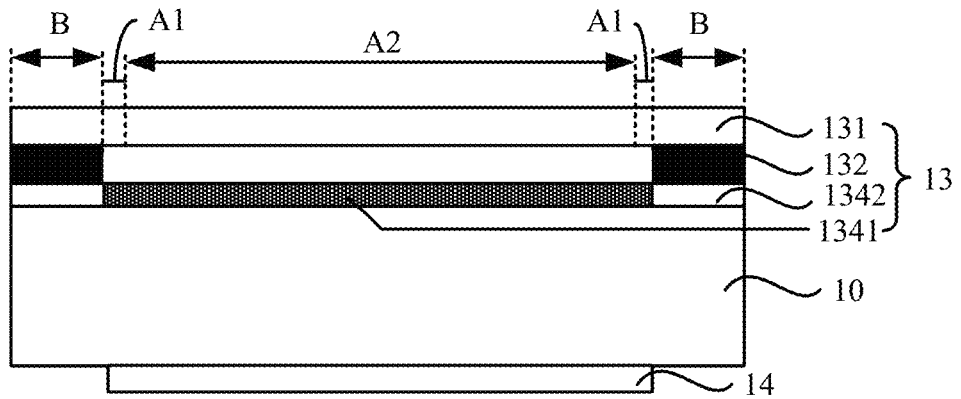
FIG. 23a is another diagram of a correspondence between a non-polarized part and a display region according to an embodiment of this application.

For a correspondence between the non-polarized part 1341 and the display region A, as shown in FIG. 23a, the non-polarized part 1341 covers the display region A.

In some embodiments, as shown in FIG. 23a, the non-polarized part 1341 may exactly coincide with the display region A.

Figure 23B:
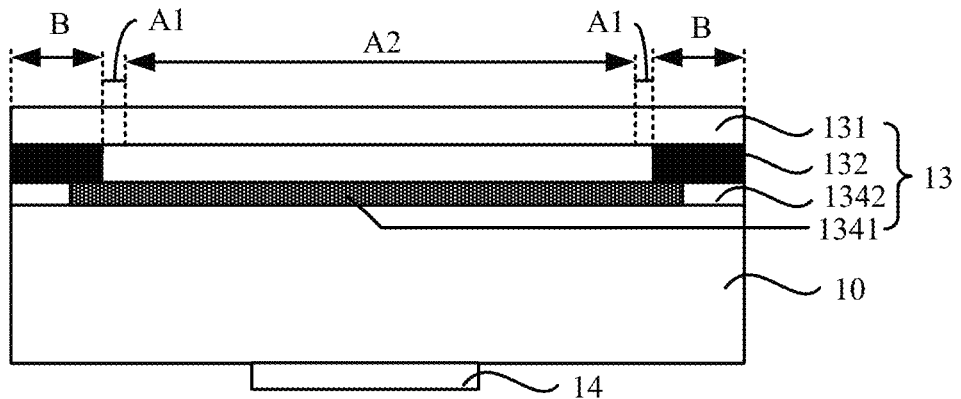
FIG. 23b is still another diagram of a correspondence between a non-polarized part and a display region according to an embodiment of this application.

In some embodiments, considering a process error, as shown in FIG. 23b, the non-polarized part 1341 may cover the display region A and extend into the peripheral region B.

In this example, the mobile terminal 01 may have a full-panel fingerprint recognition function. In this case, as shown in FIG. 23a, in the thickness direction of the mobile terminal 01, an orthographic projection of the photoelectric conversion apparatus 14 covers the display region A. For a disposing manner of the photoelectric conversion apparatus 14, reference may be made to the example of the disposing manner of the photoelectric conversion apparatus 14 in the display panel 101 when the mobile terminal 01 has the full-panel fingerprint recognition function.

The mobile terminal 01 may alternatively have a local fingerprint recognition function. In this case, as shown in FIG. 23b, in the thickness direction of the mobile terminal 01, an orthographic projection of the photoelectric conversion apparatus 14 is located in the display region A. For a disposing manner of the photoelectric conversion apparatus 14, reference may be made to the example of the disposing manner of the photoelectric conversion apparatus 14 in the display panel 101 when the mobile terminal 01 has the local fingerprint recognition function.

In this example, the non-polarized part 1341 is enabled to cover the display region A, so as to reduce a filtering function of the bearer layer 134 on displayed light, thereby improving a display effect and reducing power consumption.

Example 3

Figure 24:
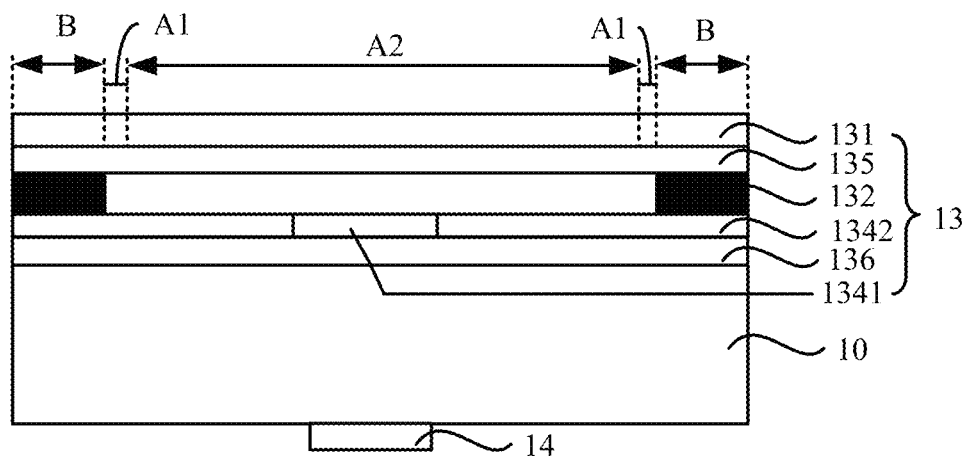
FIG. 24 is a schematic structural diagram of a non-polarized part in a hollowed-out structure according to an embodiment of this application.

A difference between this example and Example 1 lies in that as shown in FIG. 24, the non-polarized part 1341 on the bearer layer 134 is in a hollowed-out structure.

For a correspondence between the non-polarized part 1341 and the display region A, as shown in FIG. 24, the non-polarized part 1341 is located in the display region A but does not cover the display region A.

In this example, as shown in FIG. 24, the mobile terminal 01 has a local fingerprint recognition function. For a disposing manner of the photoelectric conversion apparatus 14, reference may be made to the example of the disposing manner of the photoelectric conversion apparatus 14 in the display panel 101 when the mobile terminal 01 has the local fingerprint recognition function.

The non-polarized part 1341 on the bearer layer 134 is in the hollowed-out structure, that is, a hollowed-out region 1343 is disposed on the bearer layer 134. The hollowed-out region 1343 is filled with air rather than a material.

In some embodiments, because light is refracted in the air, to avoid that an excessively thick air layer in the hollowed-out structure (a thickness of the air layer is equal to a thickness of the bearer layer 134) has a relatively large impact on an optical path, the thickness of the bearer layer 134 is between 50 μm and 200 μm.

The non-polarized part 1341 is filled with no material, so that the non-polarized part 1341 is an air layer, to reduce used materials, simplify a manufacturing process, reduce costs, and improve efficiency.

Example 4

Figure 25:
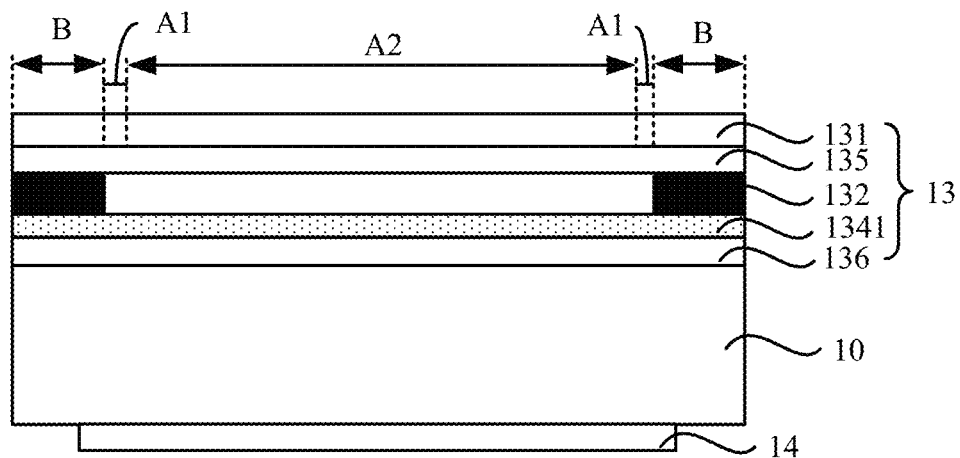
FIG. 25 is still another diagram of a correspondence between a non-polarized part and a display region according to an embodiment of this application.

The bearer layer 134 includes only the non-polarized part 1341, and a material of the bearer layer 134 is a non-polarized material. For a correspondence between the non-polarized part 1341 and the display region A, as shown in FIG. 25, a contour of the non-polarized part 1341 coincides with a contour of the peripheral region B.

The non-polarized material includes, for example, one of an optical transparent adhesive, optical transparent resin, polyimide, or polymethyl methacrylate.

In some embodiments, to ensure a bearer capability of the non-polarized part 1341, a thickness of the non-polarized part 1341 is greater than 50 μm. Considering a lightweight and thinness requirement for the mobile terminal 01, the thickness of the non-polarized part 1341 is less than 1000 μm.

The thickness of the non-polarized part 1341 is, for example, 100 μm, 200 μm, 300 μm, 400 μm, 500 μm, 600 μm, 700 μm, 800 μm, or 900 μm.

Figure 26:
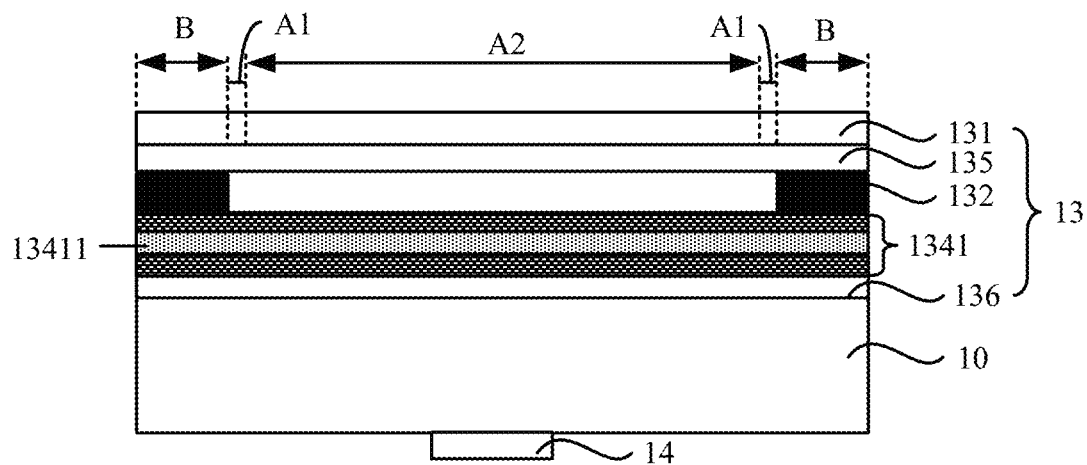
FIG. 26 is a schematic structural diagram of another non-polarized part including a plurality of transparent film layer according to an embodiment of this application.

In some embodiments, as shown in FIG. 26, the non-polarized part 1341 includes at least one transparent film layer 13411. An example in which the non-polarized part 1341 includes three transparent film layers 13411 is used for illustration in FIG. 26.

It can be understood that materials and thicknesses of the transparent film layers 13411 may be the same or may be different, but the materials of the transparent film layers 13411 are necessarily non-polarized materials.

In this example, the mobile terminal 01 may have a full-panel fingerprint recognition function. In this case, as shown in FIG. 25, in a thickness direction of the mobile terminal 01, an orthographic projection of the photoelectric conversion apparatus 14 covers the display region A.

The mobile terminal 01 may alternatively have a local fingerprint recognition function. In this case, as shown in FIG. 26, in the thickness direction of the mobile terminal 01, an orthographic projection of the photoelectric conversion apparatus 14 is located in the display region A.

In this example, the material of the bearer layer 134 is selected as a non-polarized material, so that there is no birefringence effect throughout the bearer layer 134, to reduce shielding of the bearer layer 134 on displayed light and improve a display effect.

Example 5

A difference between this example and Example 4 lies in that a material of the bearer layer 134 is a polarized material.

The bearer layer 134 includes only the non-polarized part 1341. For a correspondence between the non-polarized part 1341 and the display region A, as shown in FIG. 25, a contour of the non-polarized part 1341 coincides with a contour of the peripheral region B.

A fast axis direction of the non-polarized part 1341 is parallel to a polarization direction of a polarization layer that is of the display unit 10 and that is close to the cover body 131, and a slow axis direction of the bearer layer 134 is perpendicular to the polarization direction of the polarization layer.

It can be understood that when the display panel 101 included in the display unit 10 is a liquid crystal display panel, the polarization layer herein may be the first polarization layer 102.

When the display panel 101 included in the display unit 10 is an OLED display panel, the polarization layer herein is the third polarization layer 105.

In this embodiment of this application, a light vector direction with a slow propagation speed in the non-polarized part 1341 is a slow axis, and a light vector direction with a fast propagation speed in the non-polarized part 1341 is a fast axis.

The non-polarized part 1341 may be, for example, a PET film layer. Because the fast axis direction of the non-polarized part 1341 is parallel to the polarization direction of the polarization layer of the display unit 10, a polarization direction of light does not change regardless of a specific region, in the non-polarized part 1341, from which the light is emitted.

It should be understood that "perpendicular" does not mean "absolute perpendicular". That A is perpendicular to B may mean: An angle between A and B falls within a range of [90−a, 90+a]. "Parallel" does not mean "absolute parallel" either. That A is parallel to B may mean: An angle between A and B falls within a range of [0, b].

In this case, when polarized light emitted from the display unit 10 passes through the bearer layer 134, the slow axis direction does not change a polarization direction of transmitted light, and the polarization direction of the transmitted light is parallel to the fast axis direction. A polarization state of incident light does not change when the incident light passes through the bearer layer 134.

In this example, the same as in Example 4, the mobile terminal 01 may have a full-panel fingerprint recognition function, or may have a local fingerprint recognition function. Details are not described herein again.

Example 6

A difference between this example and Example 5 lies in that a slow axis direction of the non-polarized part 1341 is parallel to a polarization direction of a polarization layer of the display unit 10, and a fast axis direction of the non-polarized part 1341 is perpendicular to the polarization direction of the polarization layer.

For a correspondence between the non-polarized part 1341 and the display region A, as shown in FIG. 26, a contour of the non-polarized part 1341 coincides with a contour of the peripheral region B.

In this case, when polarized light emitted from the display unit 10 passes through the bearer layer 134, the fast axis direction does not change a polarization direction of transmitted light, and the polarization direction of the transmitted light is parallel to the slow axis direction. A polarization state of incident light does not change when the incident light passes through the bearer layer 134.

In this example, the same as in Example 4, the mobile terminal 01 may have a full-panel fingerprint recognition function, or may have a local fingerprint recognition function. Details are not described herein again.

Example 7

A difference between this example and Example 5 lies in that a fast axis direction and a slow axis direction of the non-polarized part 1341 each form an angle of 45° with a polarization direction of a polarization layer of the display unit 10.

For a correspondence between the non-polarized part 1341 and the display region A, as shown in FIG. 26, a contour of the non-polarized part 1341 coincides with a contour of the peripheral region B.

In some embodiments, a thickness of the non-polarized part 1341 meets the following formula: $(n_{fast}-n_{slow})*T=\frac{1}{2}*m*\lambda$.

In the formula, $n_{fast}$ is a refractive index in the fast axis direction of the non-polarized part 1341, $n_{slow}$ is a refractive index in the slow axis direction of the non-polarized part 1341, T is the thickness of the non-polarized part 1341, m is a positive integer, and $\lambda$ is a wavelength. The fast axis direction of the non-polarized part 1341 is perpendicular to the slow axis direction of the non-polarized part 1341.

It should be understood that A and B form an angle of 45° does not mean that A and B absolutely form the angle of 45°. That A and B form an angle of 45° may mean: An angle between A and B falls with a range of [45−c, 45+c].

Because a fast axis and a slow axis of the bearer layer 134 are perpendicular to each other, the polarization direction of the polarization layer forms an angle of 45° with each of the fast axis direction and the slow axis direction of the bearer layer 134, a light loss in the fast axis direction is exactly emitted from the slow axis, and a light loss in the slow axis direction is exactly emitted from the slow axis. Therefore, incident light has a relatively small light loss when passing through the bearer layer 134.

In this example, the same as in Example 4, the mobile terminal 01 may have a full-panel fingerprint recognition function, or may have a local fingerprint recognition function. Details are not described herein again.

Figure 27:
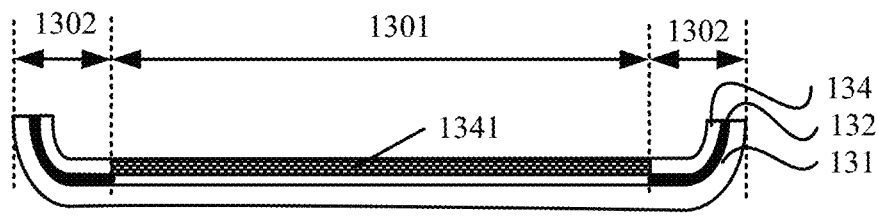
FIG. 27 is a schematic structural diagram of a cover according to an embodiment of this application.

An embodiment of this application further provides a cover 13. As shown in FIG. 27, the cover 13 includes a transmissive region 1301 and a non-transmissive region 1302, and the cover 13 includes a cover body 131, a bearer layer 134, and an ink layer 132.

The bearer layer 134 is disposed on the cover body 131, and the bearer layer 134 is located in a part of the transmissive region 1301. The bearer layer 134 includes a non-polarized part 1341, and the non-polarized part 1341 is configured to enable a polarization direction of light before the light passes through the non-polarized part 1341 to be the same as a polarization direction of the light after the light passes through the non-polarized part 1341.

The ink layer 132 is disposed on a surface of the bearer layer 134, and the ink layer 132 is located in the non-transmissive region 1302.

The cover body 131 may be a flexible substrate, or may be a rigid substrate.

Figure 28:
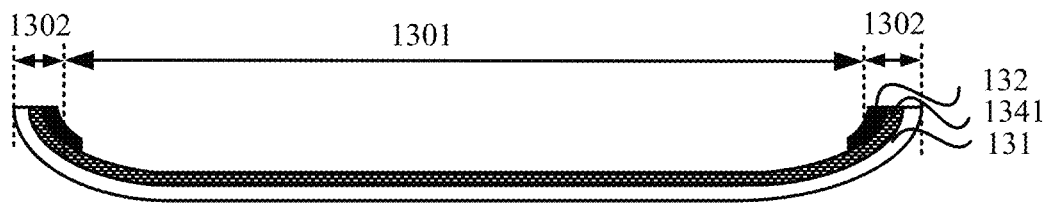
FIG. 28 is a schematic structural diagram of another cover according to an embodiment of this application.

As shown in FIG. 28, division of the transmissive region 1301 and the non-transmissive region 1302 is unrelated to a shape of the cover body 131. For a curved cover, an arc surface unnecessarily can be only the non-transmissive region 1302, and may be a part of the transmissive region 1301.

As shown in FIG. 27, the non-polarized part 1341 may be located in the transmissive region 1301 but does not cover the transmissive region 1301.

As shown in FIG. 28, the non-polarized part 1341 may cover the transmissive region 1301. For example, the entire bearer layer 134 may be used as the non-polarized part 1341.

As shown in FIG. 27, the ink layer 132 may be disposed on a surface that is of the bearer layer 134 and that is close to the cover body 131.

As shown in FIG. 28, the ink layer 132 may be disposed on a surface that is of the bearer layer 134 and that is away from the cover body 131.

According to the cover 13 provided in this embodiment of this application, the ink layer 132 is disposed on the bearer layer 134. In a manufacturing process, the ink layer 132 may be coated on the bearer layer 134, and then the bearer layer 134 coated with the ink layer 132 is attached to the cover body 131, so as to revolve a problem that ink cannot be evenly coated when the ink is directly coated on the cover body 131. Based on this, the bearer layer 134 includes the non-polarized part 1341, and the non-polarized part 1341 does not change a polarization direction of light. Therefore, no loss is caused when light passes through the non-polarized part 1341. When the cover 13 is applied to a mobile terminal that has a front fingerprint recognition function, strength of a signal that finally reaches a photoelectric conversion apparatus 14 can be improved, thereby ensuring a fingerprint recognition effect.

Figure 29:
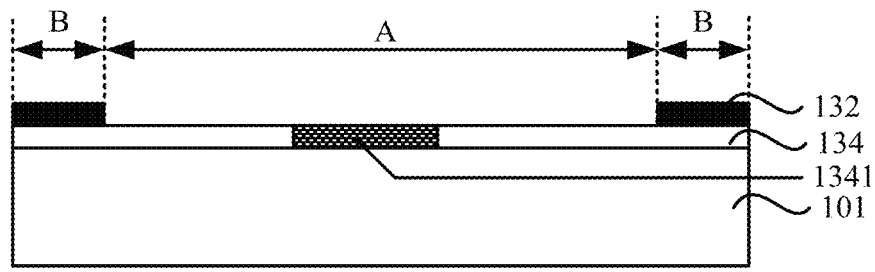
FIG. 29 is a schematic structural diagram of a display component according to an embodiment of this application.

An embodiment of this application further provides a display component. As shown in FIG. 29, the display component includes a display panel 101, a bearer layer 134, and an ink layer 132.

The bearer layer 134 is located on a light emitting side of the display panel 101, and the bearer layer 134 is located in a partial transmissive region of a display region A of the display component. The bearer layer 134 includes a non-polarized part 1341, and the non-polarized part 1341 is configured to enable a polarization direction of light before the light passes through the non-polarized part 1341 to be the same as a polarization direction of the light after the light passes through the non-polarized part 1341.

The ink layer 132 is disposed on a surface of the bearer layer 134, and the ink layer 132 is located in a peripheral region B of the display component.

The display panel 101 may be a liquid crystal display panel, or may be an OLED display panel.

As shown in FIG. 29, the ink layer 132 may be disposed on a side that is of the bearer layer 134 and that is away from the display panel 101.

Figure 30:
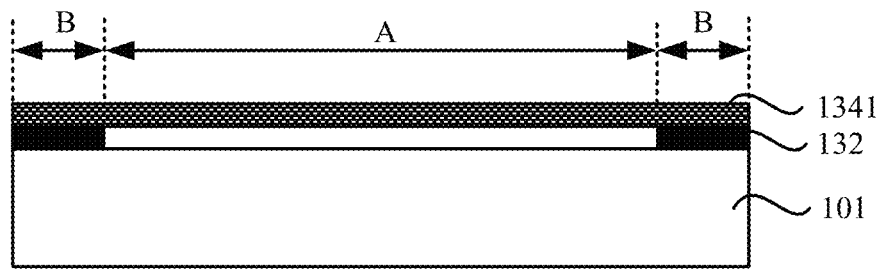
FIG. 30 is a schematic structural diagram of another display component according to an embodiment of this application.

As shown in FIG. 30, the ink layer 132 may be disposed on a side that is of the bearer layer 134 and that is close to the display panel 101.

As shown in FIG. 29, the non-polarized part 1341 may be located in the display region A but does not cover the display region A.

As shown in FIG. 30, the non-polarized part 1341 may cover the display region A.

According to the display component provided in this embodiment of this application, the ink layer 132 is disposed on the bearer layer 134. In a manufacturing process, the ink layer 132 may be silkscreen printed on the bearer layer 134, and then the bearer layer 134 on which the ink layer 132 is silkscreen printed is attached to the display panel 101, so as to revolve a problem that ink cannot be evenly coated when the ink is directly coated on the cover 13. Based on this, the bearer layer 134 includes the non-polarized part 1341, and the non-polarized part 1341 does not change a polarization direction of light. Therefore, no loss is caused when light passes through the non-polarized part 1341. When the display component is applied to a mobile terminal that has a front fingerprint recognition function, strength of a signal that finally reaches a photoelectric conversion apparatus 14 can be improved, thereby ensuring a fingerprint recognition effect.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A mobile terminal, comprising:
a display panel;
a cover body, located on a light emitting side of the display panel;
a photoelectric conversion apparatus, located in a display region of the mobile terminal;
a bearer layer, comprising a non-polarized part, wherein the bearer layer is disposed between the cover body and the display panel, and the bearer layer is located in a partial transmissive region of the display region, wherein
an orthographic projection of the photoelectric conversion apparatus on the bearer layer is located in an orthographic projection of the non-polarized part on the bearer layer, and the non-polarized part is configured to enable a polarization direction of light before the light passes through the non-polarized part and a polarization direction of the light after the light passes through the non-polarized part to have a same direction; and
an ink layer, disposed on a surface of the bearer layer, wherein the ink layer is located in a peripheral region of the mobile terminal;
wherein the ink layer is first silkscreen printed on a polyethylene terephthalate (PET) film layer by a silkscreen printing process, and then the PET film layer on which the ink layer is silkscreen printed is attached to the cover body using full lamination.

2. The mobile terminal according to claim 1, wherein the non-polarized part is located in the display region.

3. The mobile terminal according to claim 2, wherein the non-polarized part is in a hollowed-out structure.

4. The mobile terminal according to claim 1, wherein the non-polarized part is located in the display region and the peripheral region.

5. The mobile terminal according to claim 2, wherein a material constituting the non-polarized part is a non-polarized material.

6. The mobile terminal according to claim 5, wherein the bearer layer further comprises a polarized part, and the polarized part is disposed on a periphery of the non-polarized part, and a material constituting the polarized part is a polarized material.

7. The mobile terminal according to claim 2, wherein a thickness of the bearer layer is between 50 μm and 200 μm.

8. The mobile terminal according to claim 2, wherein an area of the non-polarized part is between 25 mm$^2$ and 144 mm$^2$.

9. The mobile terminal according to claim 1, wherein a contour of the non-polarized part coincides with a contour of the peripheral region.

10. The mobile terminal according to claim 9, wherein a material constituting the non-polarized part is a non-polarized material.

11. The mobile terminal according to claim 9, wherein the mobile terminal further comprises a polarization layer disposed between the display panel and the bearer layer; and
   a fast axis direction of the non-polarized part is parallel to a polarization direction of the polarization layer, and a slow axis direction of the non-polarized part is perpendicular to the polarization direction of the polarization layer; or
   a slow axis direction of the non-polarized part is parallel to a polarization direction of the polarization layer, and a fast axis direction of the non-polarized part is perpendicular to the polarization direction of the polarization layer; or
   a fast axis direction and a slow axis direction of the non-polarized part each form an angle of 45° with the polarization direction of the non-polarized part.

12. The mobile terminal according to claim 9, wherein a thickness of the bearer layer is between 50 μm and 1000 μm.

13. The mobile terminal according to claim 1, wherein the bearer layer has a transmittance greater than 95% and a haze less than 5%.

14. The mobile terminal according to claim 1, wherein the non-polarized part comprises at least one transparent film layer.

15. The mobile terminal according to claim 14, wherein a material constituting the non-polarized part is a non-polarized material;
   the mobile terminal further comprises a first transparent adhesive layer disposed between the bearer layer and the cover body, and
   a material of the transparent film layer that is in the non-polarized part and that is close to the first transparent adhesive layer and a material of the first transparent adhesive layer are a same material; or
   the mobile terminal further comprises a second transparent adhesive layer, and the second transparent adhesive layer is disposed between the bearer layer and the display panel, and
   a material of the transparent film layer that is in the non-polarized part and that is close to the second transparent adhesive layer is the same as a material of the second transparent adhesive layer.

16. A cover, comprising:
   a cover body;
   a bearer layer, disposed on the cover body, wherein the bearer layer is located in a part of a transmissive region of the cover, the bearer layer comprises a non-polarized part, and the non-polarized part is configured to enable a polarization direction of light before the light passes through the non-polarized part and a polarization direction of the light after the light passes through the non-polarized part to have a same direction; and
   an ink layer, disposed on a surface of the bearer layer, wherein the ink layer is located in a non-transmissive region of the cover;
   wherein the ink layer is first silkscreen printed on a polyethylene terephthalate (PET) film layer by a silkscreen printing process, and then the PET film layer on which the ink layer is silkscreen printed is attached to the cover body using full lamination.

17. A display component, wherein the display component comprises:
   a display panel;
   a bearer layer, disposed on a light emitting side of the display panel, wherein the bearer layer is located in a partial transmissive region of a display region of the display component, the bearer layer comprises a non-polarized part, and the non-polarized part is configured to enable a polarization direction of light before the light passes through the non-polarized part a polarization direction of the light after the light passes through the non-polarized part to have a same direction; and
   an ink layer, disposed on a surface of the bearer layer, wherein the ink layer is located in a peripheral region of the display component;
   wherein the ink layer is first silkscreen printed on a polyethylene terephthalate (PET) film layer by a silkscreen printing process, and then the PET film layer on which the ink layer is silkscreen printed is attached to the cover body using full lamination.

* * * * *